(12) United States Patent
Su

(10) Patent No.: US 11,265,940 B2
(45) Date of Patent: Mar. 1, 2022

(54) OFF GRID RADIO SERVICE SYSTEM DESIGN

(71) Applicant: Apple Inc., Cupertino, CA (US)

(72) Inventor: Li Su, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/887,109

(22) Filed: May 29, 2020

(65) Prior Publication Data

US 2020/0296783 A1 Sep. 17, 2020

Related U.S. Application Data

(63) Continuation of application No. 16/110,131, filed on Aug. 23, 2018, now Pat. No. 10,694,562.

(Continued)

(51) Int. Cl.
*H04W 76/14* (2018.01)
*H04W 56/00* (2009.01)
(Continued)

(52) U.S. Cl.
CPC .......... *H04W 76/14* (2018.02); *H04W 8/005* (2013.01); *H04W 56/0015* (2013.01);
(Continued)

(58) Field of Classification Search
CPC .. H04W 76/14; H04W 8/005; H04W 56/0015
See application file for complete search history.

(56) References Cited

U.S. PATENT DOCUMENTS

| 9,917,616 B2 | 3/2018 | Baldemair |
| 2009/0125792 A1 | 5/2009 | Lakkis |

(Continued)

FOREIGN PATENT DOCUMENTS

| CN | 102959879 A | 3/2013 |
| CN | 105164951 A | 12/2015 |

(Continued)

OTHER PUBLICATIONS

"3rd Generation Partnership Project; Technical Specification Group Radio Access Network; LTE Device to Device (D2D) Proximity Services (ProSe); User Equipment (UE) radio transmission and reception (Release 12)"; 3GPP TR 36.877, 3rd Generation Partnership Project (3GPP), Mobile Competence Centre; 650, Route Des Lucioles; F-06921 Sophia-Antipolis Cedex; France; vol. RAN WG4, No. V12.0.0; Mar. 28, 2015 pp. 1-40; XP050928178.

(Continued)

*Primary Examiner* — Kevin M Cunningham
(74) *Attorney, Agent, or Firm* — Kowert, Hood, Munyon, Rankin & Goetzel, P.C.

(57) ABSTRACT

This disclosure relates to techniques for supporting narrowband device-to-device wireless communication, including possible techniques for performing discovery in an off grid radio system. According to some embodiments, a wireless device may determine a number of synchronization signal repetitions to use for a narrowband device-to-device transmission. The wireless device may perform the transmission, including transmitting the determined number of synchronization signal repetitions. The transmission may include an indication of the number of synchronization signal repetitions used in the transmission.

20 Claims, 18 Drawing Sheets

Related U.S. Application Data

(60) Provisional application No. 62/617,998, filed on Jan. 16, 2018, provisional application No. 62/596,548, filed on Dec. 8, 2017, provisional application No. 62/573,193, filed on Oct. 17, 2017, provisional application No. 62/559,813, filed on Sep. 18, 2017.

(51) Int. Cl.
*H04W 8/00* (2009.01)
*H04W 76/28* (2018.01)
*H04W 92/18* (2009.01)
*H04W 88/02* (2009.01)

(52) U.S. Cl.
CPC ............ *H04W 76/28* (2018.02); *H04W 88/02* (2013.01); *H04W 92/18* (2013.01)

(56) References Cited

U.S. PATENT DOCUMENTS

| | | | |
|---|---|---|---|
| 2012/0307698 A1* | 12/2012 | Tavildar | H04W 56/0015 370/311 |
| 2013/0157670 A1 | 6/2013 | Koskela | |
| 2015/0215842 A1 | 7/2015 | Lim | |
| 2015/0229368 A1 | 8/2015 | Ma | |
| 2015/0264588 A1 | 9/2015 | Li | |
| 2015/0327180 A1* | 11/2015 | Ryu | H04W 52/18 370/329 |
| 2016/0135240 A1* | 5/2016 | Yoon | H04W 56/001 370/329 |
| 2016/0192332 A1 | 6/2016 | Koorapaty | |
| 2016/0270015 A1* | 9/2016 | Lin | H04W 56/0015 |
| 2017/0064533 A1 | 3/2017 | Fujikami | |
| 2017/0064620 A1 | 3/2017 | Wang | |
| 2017/0093540 A1 | 3/2017 | Lei | |
| 2017/0094621 A1 | 3/2017 | Xu | |
| 2017/0222771 A1* | 8/2017 | Chendamarai Kannan | H04L 5/0048 |
| 2017/0251472 A1 | 8/2017 | Lee | |
| 2017/0257838 A1* | 9/2017 | Patel | H04H 20/08 |
| 2017/0288848 A1 | 10/2017 | Lei | |
| 2017/0351472 A1 | 12/2017 | Passeri et al. | |
| 2018/0123849 A1* | 5/2018 | Si | H04J 11/0073 |
| 2018/0227011 A1* | 8/2018 | Yerramalli | H04B 1/7156 |
| 2019/0037466 A1* | 1/2019 | Saiwai | H04W 24/10 |
| 2019/0044690 A1 | 2/2019 | Yi | |
| 2019/0357159 A1* | 11/2019 | Pan | H04L 1/1861 |

FOREIGN PATENT DOCUMENTS

| | | |
|---|---|---|
| CN | 106063306 A | 10/2016 |
| JP | 2004519887 A | 7/2004 |
| JP | 2015142346 A | 8/2015 |
| JP | 2016511611 A | 4/2016 |
| JP | 2016197926 A | 11/2016 |
| JP | 2016535501 A | 11/2016 |
| JP | 2017509221 A | 3/2017 |
| KR | 101768360 | 8/2017 |
| WO | 2017052326 A1 | 3/2017 |

OTHER PUBLICATIONS

LG Electronics; "On the Design of D2DSS and PD2DSCH"; 3GPP Draft; R1-140329; 3rd Generation Partnership Project (3GPP), Mobile Competence Centre; 650, Route Des Lucioles; F-06921 Sophia-Antipolis Cedex; France, vol. RAN WG1, No. Prague, Czech; Feb. 9, 2014; XP050735876; ten pages.

Intel Corporation; "On NB-IoT scope in Rel-14 FeD2D"; 3GPP Draft; R2-163625, 3rd Generation Partnership Project (3GPP), Mobile Competence Centre; 650, Route Des Lucioles; F-06921 Sophia-Antipolis Cedex; France, vol. RAN WG2, No. Nanjing, China; May 22, 2016; XP051105063; four pages.

Nokia et al.; "Issues in 020 Discovery Signal Design"; 3GPP Draft; R1-141539; 3rd Generation Partnership Project (3GPP), Mobile Competence Centre; 650, Route Des Lucioles; F-06921 Sophia-Antipolis Cedex; France, vol. RAN WG1, No. Shenzhen, China; Mar. 30, 2014; XP050787207; six pages.

Nokia Corporation et al.; "Frequency hopping for discovery signal repetition"; 3GPP Draft; R1-144985; 3rd Generation Partnership Project (3GPP), Mobile Competence Centre; 650, Route Des Lucioles; F-06921 Sophia-Antipolis Cedex ; France, vol. RAN WG1, No. San Francisco, USA; Nov. 17, 2014; XP050876031; six pages.

Extended European Search Report, European Patent Application No. 18191362.5, dated Jan. 16, 2019; eleven pages.

Office Action, Japanese Patent Application No. 2018-162031, dated Aug. 2, 2019; six pages.

Alcatel-Lucent Shanghai Bell, Alcatel-Lucent; "Preamble design for D2D Discovery"; 3GPP TSG-RAN WG1 Meeting #76bis; R1-141254; Shenzhen, China; Apr. 4, 2014; four pages.

Nokia Corporation, Nokia Networks; "Frequency hopping for discovery signal repetition"; 3GPP TSG-RAN WG1 Meeting #79; R1-144985; San Francisco, USA; Nov. 21, 2014; five pages.

First Examination Report from India Application No. 201814032061, dated Jul. 3, 2020, six pages.

Office Action for CN Patent Application No. 201811006609.4, dated Apr. 16, 2021, 12 pages.

Alcatel-Lucent Shangahi Bell et al. "Preambel design for D2D Discovery"; 3GPP TSG RAN WG1 Meeting #76bis R1-141254, Shenzhen, China, Mar. 31-Apr. 4, 2014, 4 pages.

Nokia Corporation et al. "Frequency hopping for discovery signal repetition"; 3GPP TSG-RAN WG1 Meeting #79 R1-144985, San Francisco, USA, Nov. 17-21, 2014,5 pages.

* cited by examiner

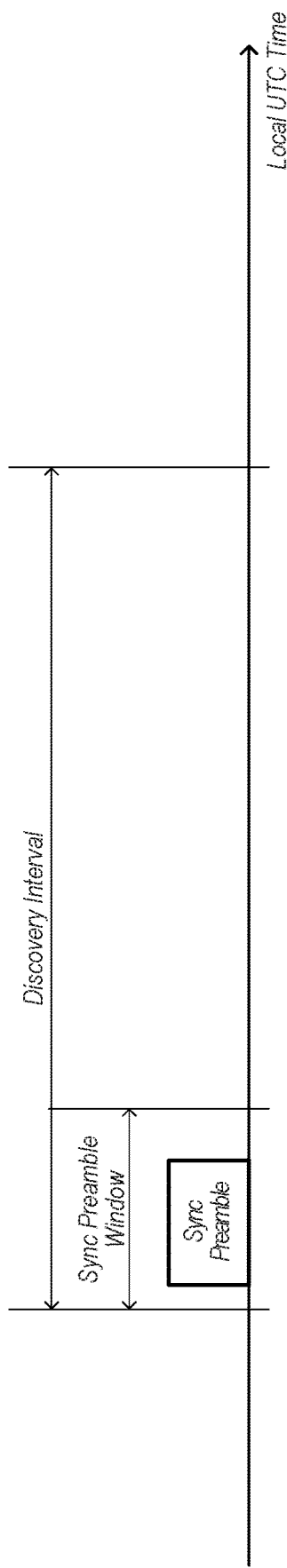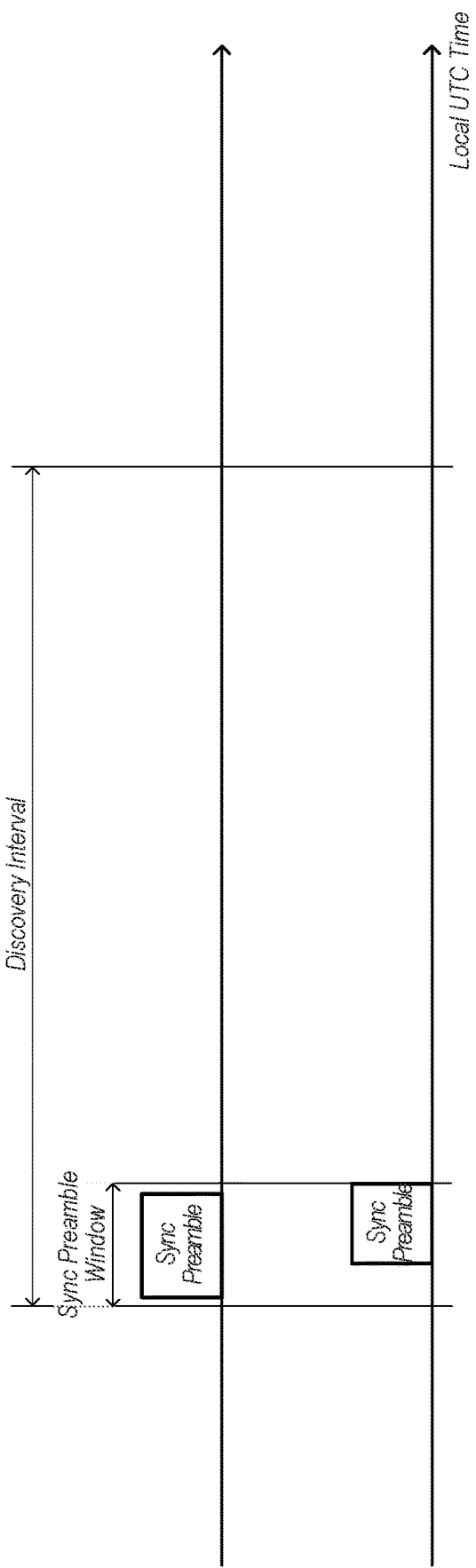
FIG. 19
FIG. 20

OFF GRID RADIO SERVICE SYSTEM DESIGN

PRIORITY INFORMATION

This application is a continuation of U.S. patent application Ser. No. 16/110,131, entitled "Off Grid Radio Service System Design," filed Aug. 23, 2018, which claims priority to U.S. provisional patent application Ser. No. 62/559,813, entitled "Off Grid Radio Service System Design," filed Sep. 18, 2017; U.S. provisional patent application Ser. No. 62/573,193, entitled "Off Grid Radio Service System Design," filed Oct. 17, 2017; U.S. provisional patent application Ser. No. 62/596,548, entitled "Off Grid Radio Service System Design," filed Dec. 8, 2017; and U.S. provisional patent application Ser. No. 62/617,998, entitled "Off Grid Radio Service System Design," filed Jan. 16, 2018, which are all hereby incorporated by reference in their entirety as though fully and completely set forth herein.

TECHNICAL FIELD

The present application relates to wireless communication, including to techniques for performing narrowband device-to-device wireless communications.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. Therefore, improvements in the field are desired.

SUMMARY

Embodiments are presented herein of, inter alia, systems, apparatuses, and methods for performing narrowband device-to-device wireless communications.

As noted above, the number of use cases for different classes of wireless devices with widely variable capabilities and usage expectations are growing. While many wireless communication systems primarily utilize infrastructure mode type communications, e.g., in which one or more base stations and potentially a supporting network are used as intermediaries between endpoint devices, one possible use case for wireless communication includes direct device-to-device communications. This disclosure presents various techniques for supporting such communications, including features and techniques for performing device-to-device discovery communications using relatively narrow bandwidth communication channels.

According to the techniques described herein, a preamble based approach to performing device-to-device synchronization may be used, e.g., as opposed to a synchronization master based approach, among various possibilities. A communication framework with timing based around a common reference time such as coordinated universal time (UTC) and periodic discovery intervals may be used, including regular synchronization preamble windows, anchor windows, and schedule intervals. During synchronization preamble windows, devices may perform synchronization and initiate discovery by selecting a common or dedicated preamble sequence from a group of preamble sequences associated with a sync ID appropriate to the type of discovery desired, such as presence discovery or peer discovery. The sequence to select and/or the frequency at which the sequence is transmitted may also depend on the time at which the transmission occurs, e.g., according to the common reference time. The frequency at which a discovery response to the preamble sequence is transmitted, may also depend on the time according to the common reference time, and/or the preamble sequence in response to which the discovery response is transmitted, e.g., according to a frequency hopping sequence, at least according to some embodiments.

Further according to the techniques disclosed herein, device-to-device communications may be performed that include a variable number of synchronization signal repetitions, e.g., once initial synchronization has been performed. A wireless device may determine the number of repetitions to be used on a given occasion based on previous communications received, e.g., based on measurements (e.g., signal strength, signal quality) and/or the device's own experience of receiving (e.g., number of repetitions used to successfully detect/decode) those previous communications, and/or based on feedback included in those previous communications (e.g., indications of transmit power used in those communications).

Once the number of repetitions has been determined, the wireless device may provide an indication of the number of repetitions used as part of the transmission, e.g., to assist receiving devices to determine the number of repetitions used. For example, in some embodiments, different values of a root index used in conjunction with the synchronization signal may be defined as indicating different numbers of synchronization signal repetitions, and the root index value selected for the transmission may be a root index value that is defined as indicating the determined number of repetitions.

Thus, the number of synchronization signal repetitions may be varied to account for different link conditions between different wireless devices and/or at different times. This may help wireless devices adapt their communications to provide more robust communications when conditions are poor and to avoid unnecessary power consumption and communication medium resource usage when conditions are good, at least according to some embodiments.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 6-25 illustrate further possible aspects and features of exemplary possible narrowband device-to-device communications, according to some embodiments.

Figure 1:
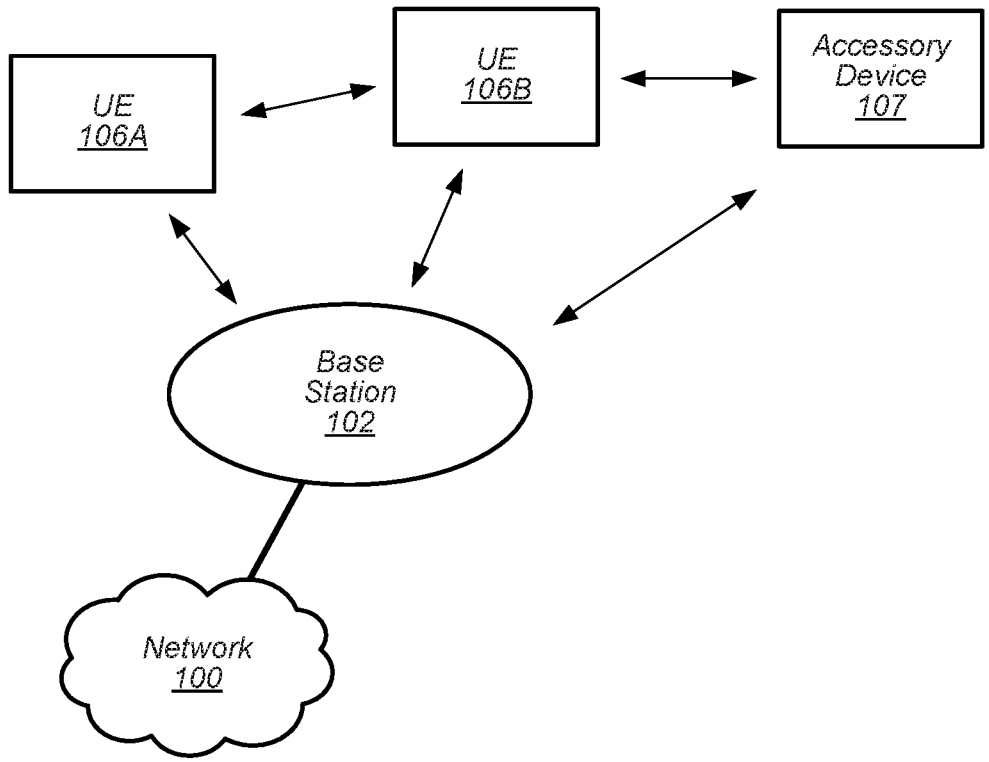
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
OGRS: Off Grid Radio Service
IoT: Internet of Things
NB: Narrowband
D2D: device-to-device
OOC: out-of-coverage Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
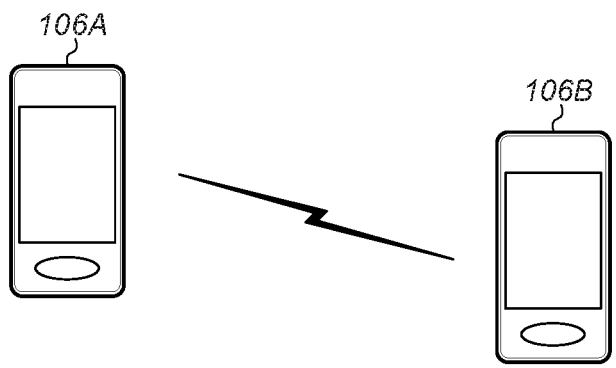
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS- CDMA), LTE, LTE-Advanced (LTE-A), NR, OGRS, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, OGRS, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, according to at least some aspects of this disclosure, the UE 106A and UE 106B may be capable of arranging and performing narrowband D2D communication (e.g., including narrowband D2D discovery communications) with each other even when out-of-coverage of the BS 102 and other cellular base stations.

FIG. 2 illustrates example UE devices 106A, 106B in D2D communication with each other. The UE devices 106A, 106B may be any of a mobile phone, a tablet, or any other type of hand-held device, a smart watch or other wearable device, a media player, a computer, a laptop or virtually any type of wireless device.

The UEs 106A, 106B may each include a device or integrated circuit for facilitating cellular communication, referred to as a cellular modem. The cellular modem may include one or more processors (processing elements) and various hardware components as described herein. The UEs 106A, 106B may each perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UEs 106A, 106B may include one or more antennas for communicating using two or more wireless communication protocols or radio access technologies. In some embodiments, one or both of the UE 106A or UE 106B might be configured to communicate using a single shared radio. The shared radio may couple to a single antenna, or may couple to multiple antennas (e.g., for MIMO) for performing wireless communications. Alternatively, the UE 106A and/or UE 106B may include two or more radios. Other configurations are also possible.

Figure 3:
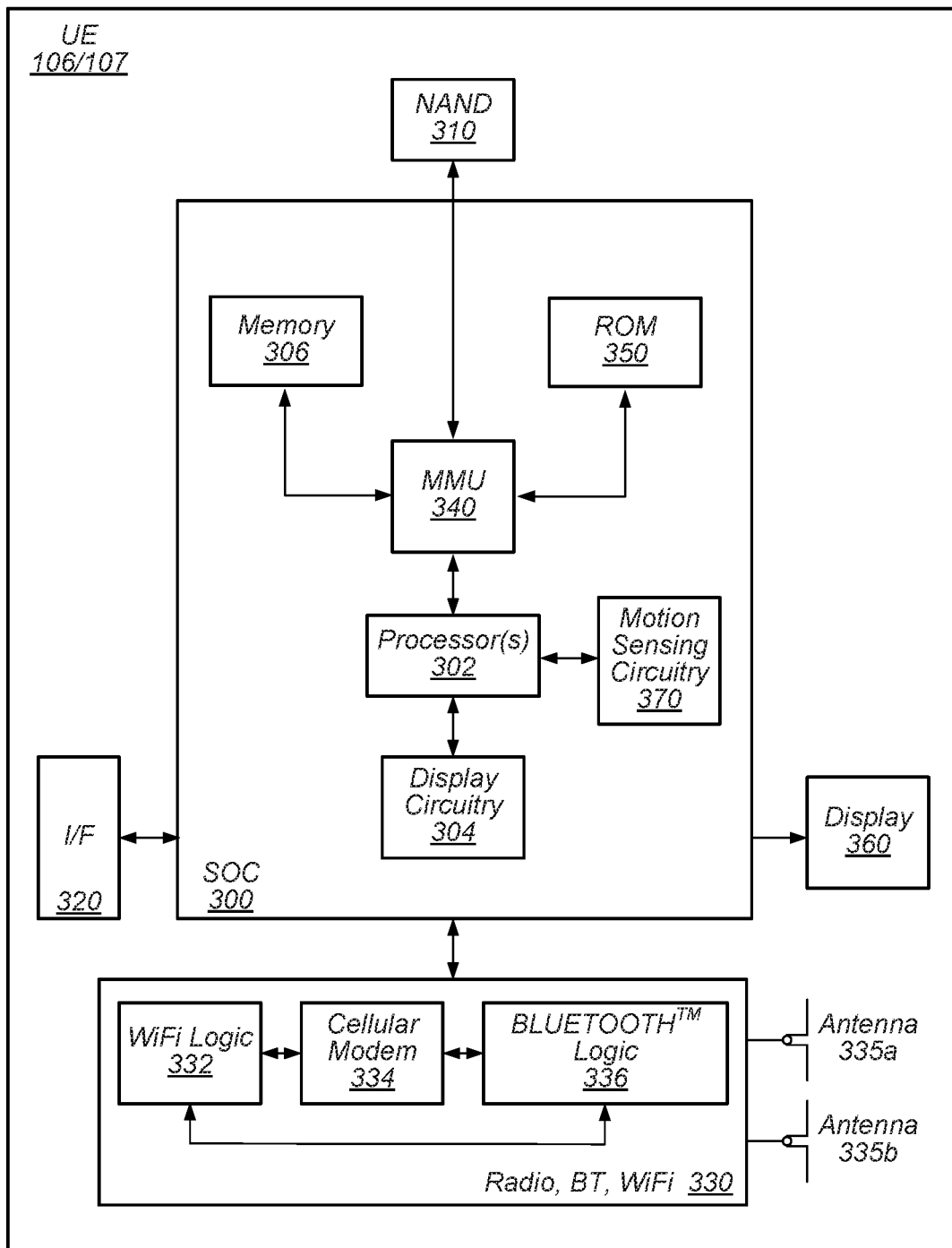
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, OGRS, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
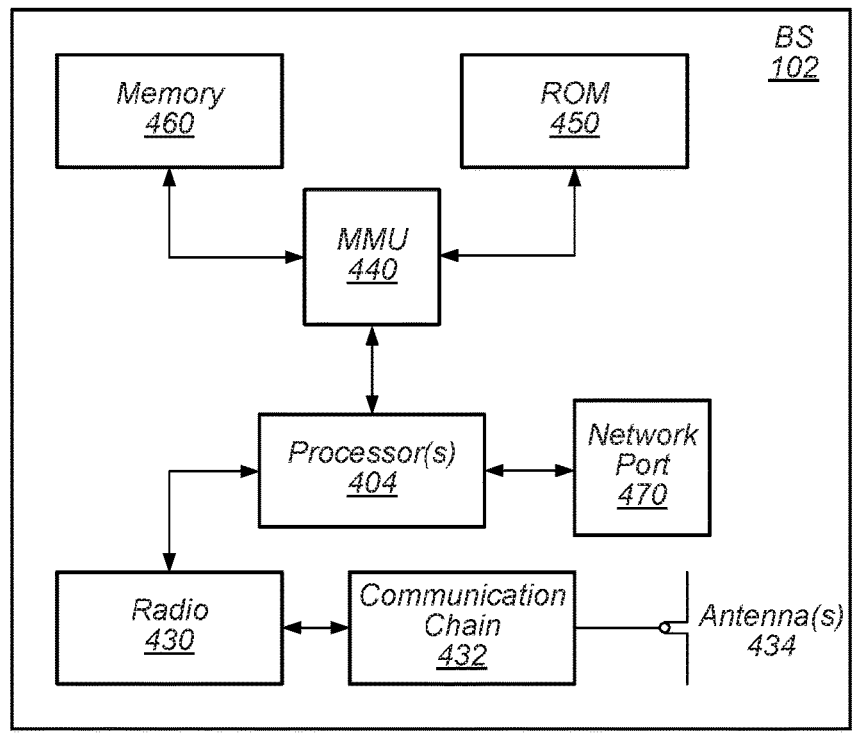
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, OGRS, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. For example, while many of the features described herein relate to device-to-device communication that can be performed by UE devices without relying on an intermediary base station, a cellular base station may be configured to also be capable of performing device-to-device communication in accordance with the features described herein. As another possibility, the BS 102 may be instrumental in configuring a UE 106 to perform narrowband device-to-device communication according to the features described herein, and/or certain features described herein may be performed or not performed by a device based at least in part on whether there is a BS 102 providing cellular service within range of the device. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
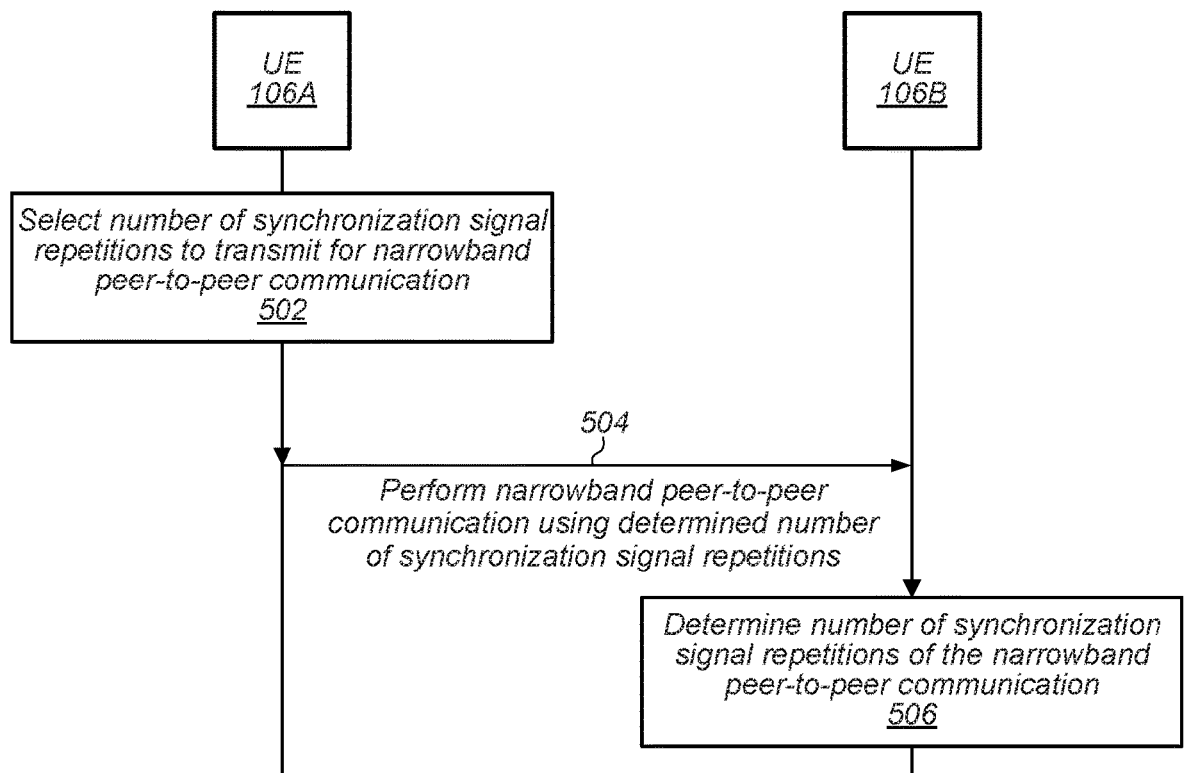
FIG. 5 is a communication flow diagram illustrating an exemplary method for performing narrowband device-to-device wireless communications, according to some embodiments.

FIG. 5—Communication Flow Diagram

FIG. 5 is a communication flow diagram illustrating a method for performing narrowband device-to-device wireless communications, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as the UEs 106A-B or 107 illustrated in and described with respect to FIGS. 1-3, or more generally in conjunction with any of the computer systems or devices shown in the above Figures, among other devices, as desired. Note that while at least some elements of the method of FIG. 5 are described in a manner relating to the use of communication techniques and/or features associated with LTE, OGRS, and/or 3GPP specification documents, such description is not intended to be limiting to the disclosure, and aspects of the method of FIG. 5 may be used in any suitable wireless communication system, as desired. As shown, the method may operate as follows.

In 502, a first wireless device (e.g., UE 106A) may determine a number of synchronization signal repetitions to transmit as part of a narrowband D2D/P2P communication. The communication may be performed using one or more Narrowband Internet of Things (NB-IoT) carriers, and/or may be performed using any of various other possible (e.g., narrowband) carriers.

The number of synchronization signal repetitions may be determined based at least in part on characteristics of a transmission from a second wireless device (e.g., a wireless device to which the narrowband P2P communication is directed, such as UE 106B) that was previously received by the first wireless device, according to some embodiments. For example, the first wireless device may estimate how many repetitions the second device might need to successfully detect and/or decode the narrowband P2P communication based on the signal strength, signal quality, and/or number or repetitions used by the first wireless device to detect and/or decode the previously received transmission. As another possibility (e.g., if the first wireless device does not have any (e.g., sufficiently recent) previous communications on which to base an estimation of how many repetitions the second device might need to successfully detect and/or decode the narrowband P2P communication), the first wireless device may select the number of synchronization signal repetitions conservatively (e.g., may choose a configured maximum number of repetitions), may arbitrarily select a number of repetitions, or may select a number of repetitions to use in any other desired manner.

The narrowband P2P communication may be any of various types of communication. As one possibility, the narrowband P2P communication may include a discovery message in addition to the synchronization signal, and may be a discovery transmission, e.g., to facilitate discovering other wireless devices and potentially establishing one or more P2P communication links with those wireless devices. As another possibility, the narrowband P2P communication may be a control and/or data communication, e.g., that may be used to communicate control signaling and/or data between two wireless devices that have already established a P2P communication link.

In 504, the first wireless device may perform the narrowband P2P communication using the determined number of synchronization signal repetitions. At least in the case of a discovery transmission, the first wireless device may transmit a repetition of the narrowband P2P communication on each frequency of a predetermined sequence of discovery transmission frequencies. The discovery transmission frequency sequence may be associated with a scan channel in use by the first wireless device. The scan channel may be determined based at least in part on a common MAC address associated with the scan channel, such that other wireless devices utilizing the same common MAC address to select a scan channel for their discovery signaling might also select the same scan channel. As another possibility, the discovery transmission frequency sequence may be associated with a page channel of a wireless device to which the discovery transmission is directed (e.g., the second wireless device). The page channel associated with a wireless device may be determined based on a MAC address for the device, according to some embodiments. As still another possibility, the discovery transmission frequency sequence may be associated with a page channel of a group of wireless devices to which the discovery transmission is directed (e.g., including the second wireless device). For example, in some embodiments, a group of wireless devices may be able to determine a group MAC address that can be used to determine a group page channel that can be monitored by members of the group.

The timing of the discovery transmission (e.g., including when to begin transmitting each discovery transmission repetition on which frequency of the discovery transmission frequency sequence) may be based at least in part on a local clock of the first wireless device. For example, according to the P2P communication system in which the first wireless device operates, a set of discovery transmission repetitions may be performed once per "discovery period" (e.g., for up to a specified number of discovery periods), and the start and end timing of each discovery period and/or the timing of the set of discovery transmission repetitions within each discovery period may be based on the value of the local clock of the wireless device performing the discovery transmissions.

As previously noted, each discovery transmission repetition may include a selected number of synchronization signal repetitions in addition to the discovery message. According to some embodiments, the number of synchronization signal repetitions used may be indicated, e.g., using a root index value for at least a portion of the synchronization signal. For example, the synchronization signal may include a primary synchronization signal (PSS), and a root index value for a Zadoff-Chu sequence that may be used as the PSS may be used to indicate the number of synchronization signal repetitions used. Thus, in such a case, the root index value of the PSS may be selected by the first wireless device based on the selected number of synchronization signal repetitions to use.

According to some embodiments, the synchronization signal may further include a secondary synchronization signal (SSS), which may also include a Zadoff-Chu sequence. If desired, a root index value for a Zadoff-Chu sequence that may be used as the SSS may be used to provide a device identifier for the first wireless device.

According to some embodiments, the synchronization signal may still further include a physical broadcast channel that indicates a frame number and/or a subframe number according to the local clock of the first wireless device.

The second wireless device may receive the narrowband P2P communication from the first wireless device. In 506, the second wireless device may determine the number of synchronization signal repetitions of the narrowband P2P communication received from the first wireless device. For example, as previously noted, a root index value for a portion of the synchronization signal may be indicative of the number of synchronization signal repetitions of the narrowband P2P communication, such that the second wireless device may be able to determine the number of synchronization signal repetitions based at least in part on the root index value for that particular portion of the synchronization signal. Based on the number of repetitions of the synchronization signal, the second wireless device may in turn be able to determine when a portion of the narrowband P2P communication subsequent to the synchronization signal begins.

As previously noted, at least in some instances, the narrowband P2P communication may include a discovery message. Accordingly, in such instances, the second wireless device may attempt to decode the discovery message, e.g., to determine if the second wireless device is a discovery target of the first wireless device.

If the second wireless device is not able to successfully decode the discovery message, the wireless device may combine the discovery message with one or more additional discovery messages subsequently transmitted by the first wireless device. For example, the second wireless device may continue monitoring the same frequency on which the narrowband P2P communication from the first wireless device was received, and may receive another such narrowband P2P communication from the first wireless device in the next discovery window. As another possibility, the second wireless device may be able to determine the discovery transmission frequency sequence in use by the first wireless device (e.g., based at least in part on the synchronization signal portion of the narrowband P2P communication), and may follow the discovery transmission frequency sequence and receive one or more additional repetitions of the discovery transmission on other frequencies of the discovery transmission frequency sequence, e.g., in the same discovery window and/or in the subsequent discovery window. Combining such repetitions may improve the effective SNR and thus improve the likelihood of successful decoding of the (combined) discovery message.

If the attempt to decode the discovery message is (e.g., eventually) successful, and the second wireless device is a discovery target indicated in the discovery message, the second wireless device may perform a discovery response transmission in response to the discovery message. Similar to the discovery transmission, the discovery response transmission may include a number of repetitions transmitted on each frequency of a sequence of discovery response transmission frequencies. The discovery response frequency sequence may be determined based at least in part on the discovery transmission. For example, the synchronization signal and/or the discovery message may include information indicating the discovery response frequency sequence and/or information that can be used to determine the discovery response frequency sequence. In some instances, the discovery response frequency sequence may be the same frequency sequence as the discovery transmission frequency sequence.

The discovery response transmission may include a preamble. The second wireless device may determine a number of repetitions of the preamble to include in the discovery response transmission, e.g., in a similar manner as the first wireless device determined the number of repetitions of the synchronization signal to transmit. For example, the number of preamble repetitions may be selected based at least in part on an estimate of how many repetitions the first wireless device might need to detect and decode the discovery response transmission, which might in turn be based at least in part on the signal strength and/or quality of the narrowband P2P communication(s) received from the first wireless device, and/or the number of narrowband P2P communication repetitions used by the second wireless device to successfully detect and decode the discovery transmission. At least according to some embodiments the second wireless device may select a root index value for the preamble based on the determined number of repetitions, e.g., to provide an indication of the number of repetitions of the preamble.

The discovery response transmission may be a response to assist the first wireless device to track the second wireless device, and/or may include a connection request message. At least according to some embodiments, in either case, the discovery response transmission may include an indication of a device identifier (e.g., a MAC address or an indication thereof) for the second wireless device and a local clock value for the second wireless device. If the discovery response transmission includes a connection request message, either the second wireless device may synchronize to the local clock of the first wireless device (e.g., the first wireless device may be considered master with respect to the P2P connection between the first wireless device and the second wireless device), or the first wireless device may synchronize to the local clock of the second wireless device (e.g., the second wireless device may be considered master with respect to the P2P connection between the first wireless device and the second wireless device). In either case, the first wireless device may provide an acknowledgement to the second wireless device, but the timing of the acknowledgement and/or the frequency on which the acknowledgement is provided may differ depending on which wireless device is determined to be master.

As part of establishing the P2P connection between the first wireless device and the second wireless device, the devices may establish an initial anchor point and an anchor point periodicity, which may be used to ensure the connection remains fresh. For example, the anchor point periodicity may define the maximum length of time that the first wireless device and the second wireless device can go without communicating and still consider the P2P connection valid. If desired, the anchor point periodicity may function as an effective means of providing connected mode discontinuous reception (C-DRX) functionality, e.g., such that each device can enter a reduced power consumption (e.g., sleep) mode (e.g., unless other wireless communication operations are desired) between anchor points, and wake at each anchor point to transmit to and/or receive from the other wireless device.

Note that while the method of FIG. 5 primarily relates to narrowband P2P communication between two wireless devices, similar techniques may be used to establish and communicate according to any number of additional P2P connections between wireless devices. For example, either or both of the first wireless device and the second wireless device may utilize similar techniques to establish additional P2P connections with one or more other wireless devices in parallel with their P2P communication link with each other, and to communicate with those other wireless devices according to those additional P2P connections.

FIGS. 6-14 and Additional Information

FIGS. 6-14 and the following additional information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

At least some existing wireless communication technologies include framework elements for device-to-device communication, also referred to as sidelink communication. For example, the 3GPP standards organization includes D2D/sidelink protocols such as Proximity Services (ProSe), e.g, in which in addition to synchronization signals transmitted in the central 6 RBs of the system bandwidth, discovery pool resources, sidelink control channel allocations, and sidelink shared channel allocations may be located in various other (e.g., outer) RBs of the system bandwidth over time. Such sidelink communication performed according to existing D2D protocols may encompass relatively wideband operation, e.g., encompassing at least 6 RBs (e.g., 1.4 MHz) and potentially up to 100 RBs (e.g., 20 MHz).

Figure 6:
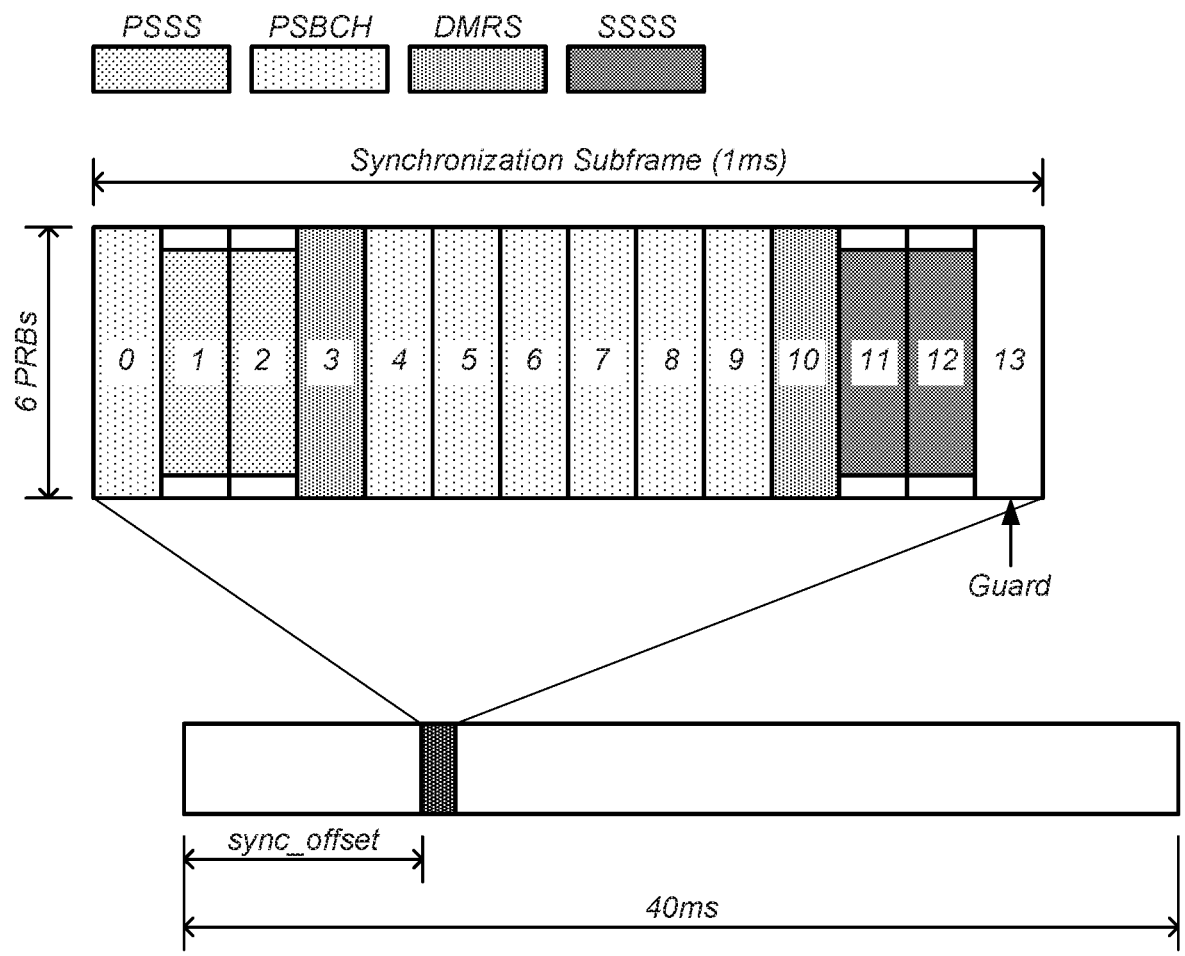

FIG. 6 illustrates a possible synchronization subframe format that could be used in conjunction with D2D/sidelink communication, according to some embodiments. As shown, the sync subframe may include two types of signals for synchronization, as well as reference signals (e.g., demodulation reference symbols or DM-RS). The synchronization signals may include sidelink synchronization signals (SLSS) (e.g., primary sidelink synchronization signals (PSSS), secondary sidelink synchronization signals (SSSS)), which may be used for obtaining/maintaining synchronization in time and frequency. The synchronization signals may also include a master information block SL (MIB-SL) on a physical sidelink broadcast channel, which may provide at least a frame and subframe number. Sync subframes may be transmitted once per a given sync window/period (e.g., which may be 40 ms or any other desired length), possibly at a configurable offset. According to some embodiments, SLSS may be transmitted in combination with data transmissions in SL-SCCH periods, and SLSS may also be transmitted in combination with discovery transmissions in discovery periods.

Figure 7:
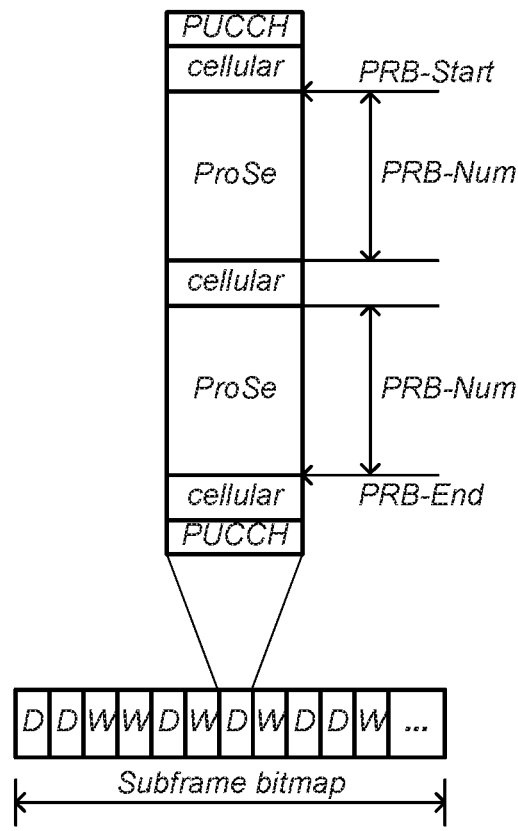
Figure 7:
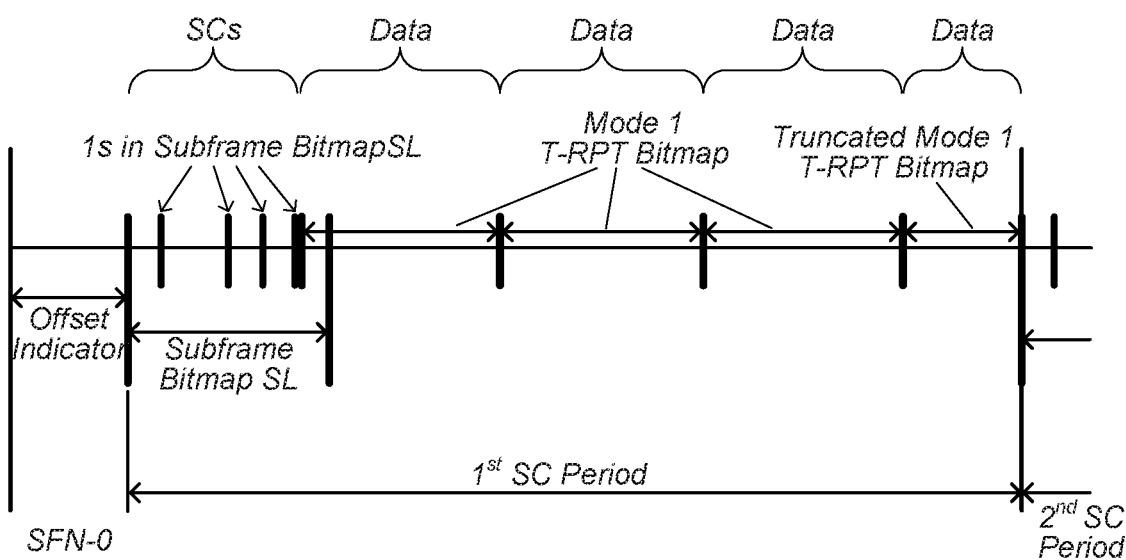

FIG. 7 illustrates a possible resource pool configuration that could be used in conjunction with D2D/sidelink communication, according to some embodiments. At least according to some embodiments, a wireless device may have multiple resource pools for SL transmissions and multiple resource pools for receiving SL communications. A resource pool may include a sync configuration period, a SL control period, and a set of subframes and resource blocks. The sync configuration may include a sync subframe, which may indicate frame and subframe timing for the SL control period. The SL control period may include a set of subframes, (e.g., subframe bitmap(s)), and may be split into two regions, a control region and a data region. The SC period may begin at an offset from SFN=0 and may be periodically repeated with a configurable length (e.g., between 40 ms and 320 ms, or any other desired range). The control region may include a subframe bitmap that indicates subframe candidates that can be used for physical sidelink control channel communications. The data region may begin after the control region and may include another bitmap ("T_RPT") indicating the subframes that can be used for data transmission. This bitmap may be repeated until the end of the SC period.

Sidelink control information (SCI) may be transmitted in a candidate PSCCH region as two identical transmissions, e.g., occupying one pair of resource blocks but in different frames. At least according to some embodiments, the SCI may be transmitted using QPSK modulation. As one possibility for selecting when SCI is transmitted, in a wireless device self-selection mode, a wireless device may select a subframe to use for SCI transmission from the configured resource pool in a random way. The SCI may provide a resource block assignment for the data region, a time resource pattern to indicate which subframes are used for the data region, a modulation and coding scheme, and a group designation ID (e.g., the 8 least significant bits of the ProSe Layer-2 group ID), according to some embodiments.

Media access control (MAC) protocol data units (PDUs) may be transmitted in an indicated physical sidelink shared channel (PSSCH) region. A MAC PDU may be sent as one transport block within one subframe, and may be retransmitted 3 times, with each transmission having a different redundancy version according to a fixed pattern. When there is more data to send after such a transmission, a wireless device may create another MAC PDU to be sent on the next 4 available subframes from the data region. A MAC PDU may have a SL-SCH subhead, which may indicate the transmitting wireless device (e.g., a 24 bit sourceID) and its intended group ID (e.g., the 16 most significant bits of the ProSe Layer2 group ID).

Figure 8:
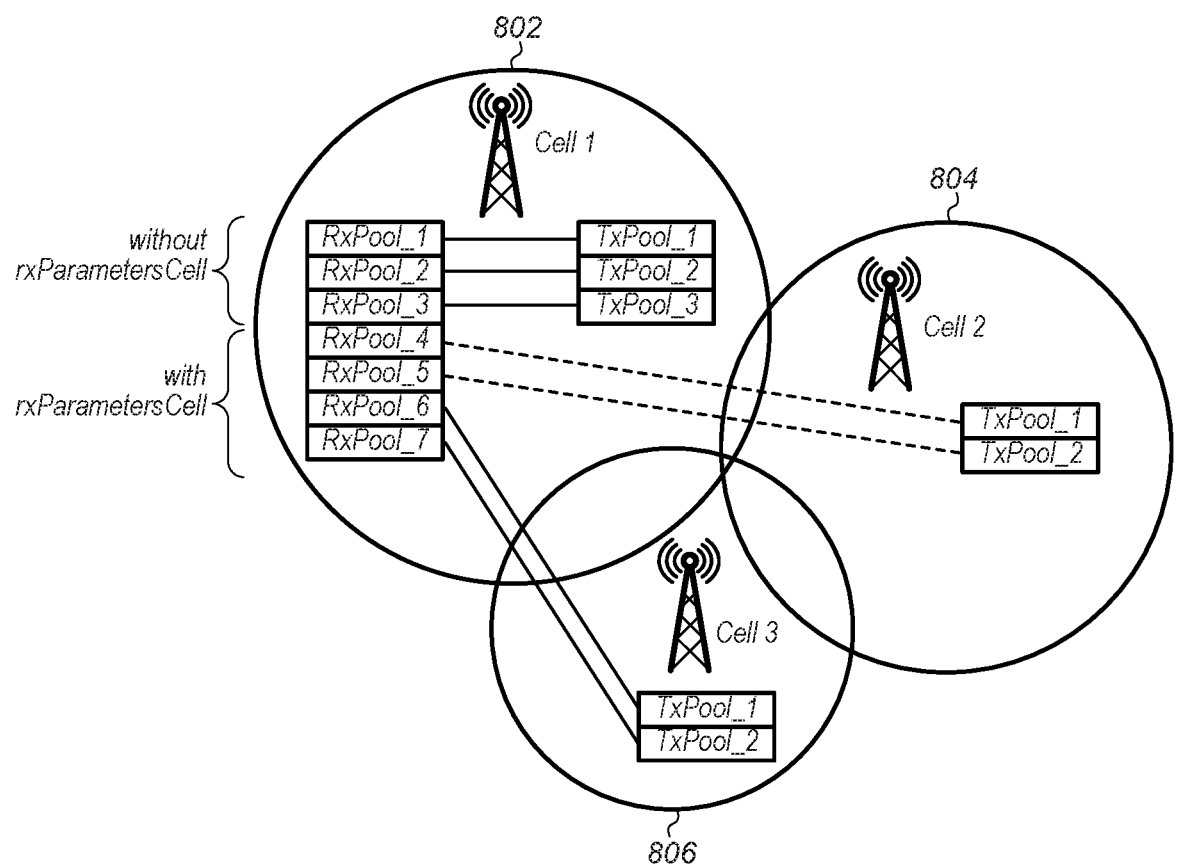

FIG. 8 illustrates a possible distribution of different resource pools between devices in different serving cells that could be used in conjunction with D2D/sidelink communication, according to some embodiments. As shown, some TX and RX pools may be configured within a single cell (e.g., within cell 1 802). For communication between wireless devices in the same serving cell, it may be the case that all TX and RX pools can use the serving cell's sync signal. As further shown, it may also be possible for some associated TX and RX pools to be configured in different serving cells (e.g., some RX pools in cell 1 802 may be associated with TX pools in cell 2 804 and cell 3 806). For communication between wireless devices from different cells or out of coverage, transmissions from a TX pool may need to include an associated sync signal; receiving on a RX pool may also need its associated sync signal. Providing multiple such TX and RX pools and with different sync configurations may facilitate communication between wireless devices from different cells or those that are out of coverage.

Figure 9:
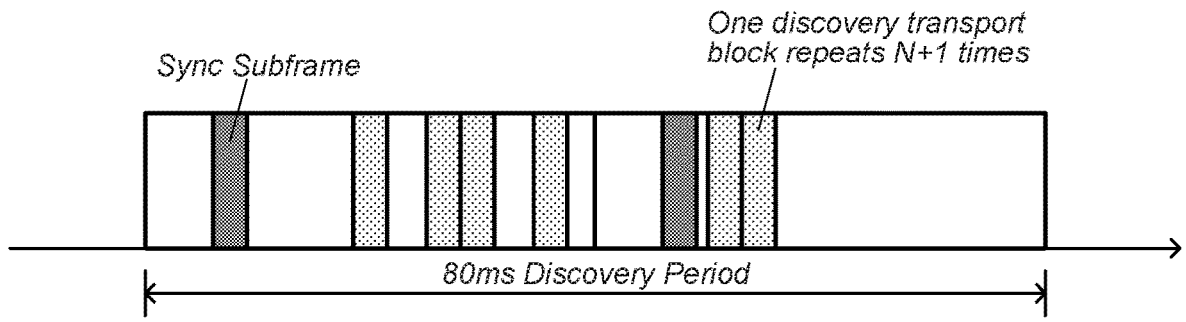

FIG. 9 illustrates a possible discovery period that could be used in conjunction with D2D/sidelink communication, according to some embodiments. Sidelink discovery may include a wireless device repeatedly broadcasting short fixed-size messages on a physical sidelink discovery channel (PSDCH) that can be directly detected by other nearby wireless devices. According to some embodiments, a fixed size payload of 232 bits may be used for PSDCH communications. A receiving device may search for PSDCH communications in a discovery resource pool. The PSDCH subframe pool may be indicated by periodic repetition of a subframe bitmap. A PSDCH resource block pool may include two sets of frequency-wise consecutive resource blocks. At least in some instances, a wireless device may self-select the set of subframes and resource blocks to use for a discovery transmission from a configured resource pool. A PSDCH transport block may be transmitted over N+1 consecutive subframes within the discovery subframe pool; within each subframe, two frequency-wise consecutive resource blocks of the resource block pool may be used for the discovery transmission, with the resource blocks changing for each subframe.

While such a potentially wideband D2D framework may be useful in some instances, in at least some instances, a more narrowband deployment may be advantageous. For example, for the transmit power regimes of many devices, propagation characteristics for narrowband communications may result in greater range capacity than wider-band communications. Note that effective communication range may be further increased, at least in some instances, if a lower-frequency communication band (e.g., 900 MHz unlicensed spectrum, as one possibility) is used for the narrowband D2D communications. As another possibility, some (e.g., lower complexity) devices may be configured to perform only narrowband communications (e.g., may have RF front end limitations, and/or may have battery limitations functionally limiting capability to perform wider-band communications). As yet another possibility, some devices, even if capable of both wideband and narrowband communication, may prefer to perform narrowband communication when possible, e.g., if the narrowband communication can reduce power consumption by the devices.

Accordingly, features for supporting narrowband (e.g., 180 kHz) D2D communications are also described herein, at least according to some embodiments. The techniques described herein may be used in scenarios when one or more of the communicating wireless devices are not within communication range of a cellular base station (e.g., the devices may be OOC), according to some embodiments.

For example, Off Grid Radio Service (OGRS) is a system that is being developed to provide long range peer-to-peer (P2P)/D2D communication, e.g., in absence of a wide area network (WAN) or WLAN radio connection to support a variety of possible features. At least according to some embodiments, OGRS systems may support some or all of the features previously described herein with respect to FIG. 5.

According to some embodiments, OGRS may operate in unlicensed low ISM bands, e.g., between 700 MHz and 1 GHz, for extended range purposes, and may use one or multiple carriers of approximately 200 kHz. OGRS may be designed to meet the local spectrum regulatory requirements, such as channel duty cycle, operating frequencies, hopping pattern, LBT, maximum transmit power, and occupied bandwidth.

As one possibility for providing the physical narrowband carrier for narrowband D2D communications, a NB-IoT carrier may be used. According to some embodiments, NB-IoT carriers may be configured for use in standalone deployments (e.g., in a repurposed GSM band), guardband deployments (e.g., in a guardband frequency between LTE carriers), and inband deployments (e.g., within an LTE carrier). Alternatively, it may be possible to utilize a NB-IoT carrier in an unlicensed frequency band, e.g., in an OGRS context. In any of these possible deployment modes, NB-IoT carriers may include a variety of key features. For example, among various possible characteristics, NB-IoT carriers may support flexible timelines for control and data channels; peak rates of approximately 20 kbps in the downlink and 60 kbps in the uplink may be supported; single tone (e.g., 3.75 KHz vs. 15 KHz) and multi tone (15 kHz) uplink modulation, using pi/2 binary phase shift keying or pi/4 quadrature phase shift keying may be used (quadrature phase shift keying may also be used in the downlink); single antenna, half duplex frequency division duplexing may be used; and/or a per-UE carrier bandwidth of 180 kHz may be used, according to some embodiments. Frequency hopping features for D2D communications may be supported. In some instances, NB-IoT carriers may provide coverage enhancement features for supporting coverage up to 20 dB.

Any of a variety of features may be included in an OGRS system, including when operating in regulated unlicensed spectrum, such as 900 MHz unlicensed spectrum. For example, frequency hopping spread spectrum (FHSS) may be used. Channel carrier frequencies may be separated by a minimum of 25 kHz, or the 20 dB bandwidth of the hopping channel, whichever is the greater. If the 20 dB bandwidth is less than 250 kHz (e.g., as may be the case if NB-IoT carriers are used), the system may use at least 50 channels. In this case, the average dwell time on a particular channel may not exceed 400 ms within a 20 second period (e.g., duty cycle<=2%), and/or transmit power may be limited to 30 dBm. If the 20 dB bandwidth is 250 kHz or greater, then the system may use at least 25 channels. In this case, the average dwell time may not exceed 400 ms within a 10 second period (e.g., duty cycle<=4%), and/or transmit power may be limited to 24 dBm. For example, the following table illustrates a possible set of specified features for OGRS operation depending on the 20 dB bandwidth of the hopping channels used:

| BW | #Channel | TX Power | On Time | Dwell Time |
| --- | --- | --- | --- | --- |
| <250 KHz | >=50 | 30 dBm | 400 ms | 20 sec |
| >250 KHz | >=25 | 24 dBm | 400 ms | 10 sec |

Thus, if the 900 MHz unlicensed spectrum band (US ISM 900, 902-918 MHz) is used in conjunction with NB-IoT carriers (e.g., each having 200 kHz including guard bands), it may be possible to configure a pool of 80 frequencies, as one exemplary possibility. In another configuration, a pool of 130 frequencies spanning 902-928 MHz may be possible. Other frequency pools, e.g., having other numbers of frequencies available, are also possible. Various sets of those frequencies may be configured as "scan channels" and "page channels", which may be used for discovery and/or other purposes, if desired.

For example, a scan channel may be a sequence of a desired number of frequencies S (e.g., S=4, or any other desired number that can satisfy the desired duty cycle requirements in conjunction with other system parameters), which may be randomly selected from the pool of frequencies based on a seed number.

A page channel may similarly be a sequence of a desired number of frequencies N (e.g., N=4, or any other desired number that can satisfy the desired duty cycle requirements in conjunction with other system parameters), which may be randomly selected from the pool of frequencies based on a seed number.

According to some embodiments, each OGRS UE may also be assigned an OGRS MAC address, such as a 24 bit hash ID. Thus, as one possibility, the individual MAC address of an OGRS UE may be used as a seed to determine a page channel that the UE uses. As another possibility, a group of UEs may have a group MAC address that may be used as a group ID and that may be used as a seed to determine a page channel that the group of UEs uses. In addition, one or more common MAC address may be defined. At least in some instances, a MAC address selected from the set of common MAC addresses may be used by a UE as a seed number to determine a scan channel that the wireless device uses.

Additionally, each OGRS UE may have its own OGRS clock counter ("K_native"), such as a 28 bit counter clocked by 1 ms tick per subframe. One frame may be defined as 10 subframes, and one super frame may be defined as 1024 frames, if desired. The value of K_native may be set to a random number at initialization.

When operating in a discontinuous reception (DRX) mode on a scan channel, a UE may select a frequency ("F_scan") from the scan channel's frequency sequence based on its own local clock K_native, and may scan the frequency F_scan for a certain portion of each DRX period, while typically operating in a reduced power state for much or all of the remainder of the discovery period (e.g., unless also monitoring another scan channel or page channel, or otherwise performing another activity between DRX on-durations). According to some embodiments, the on-duration length may be set at a length equal to or longer than a discovery period length. As one example, using the previously provided example values, if the discovery message transmission time on one hopping frequency is 40 ms, with a 2% duty cycle, the discovery period may be 2 s; in this case the DRX cycle period may be 60 s and the on-duration portion may be 2 s.

Similarly, when operating in a DRX mode on a page channel, a UE may select a frequency ("F_scan") from the page channel's frequency sequence based on its own local clock K_native, and may scan the frequency F_scan for a certain portion of each DRX period, while typically operating in a reduced power state for much or all of the remainder of the discovery period. According to some embodiments, the on-duration length for monitoring the page channel may also be set at a length equal to or longer than a discovery period length. For example, a similar DRX cycle as for the scan channel (e.g., a DRX cycle period of 60 s and an on-duration portion of 2 s) may be used, if desired. Note that a UE may be able to operate in DRX with respect to multiple scan/page channels in parallel, if desired. For example, a UE might monitor both a scan channel (e.g., to listen for discovery messages from UEs that are not aware of the UE's page channel) and a page channel (e.g., to listen for discovery messages from UEs that are aware of the UE's page channel), according to some embodiments.

Figure 10:
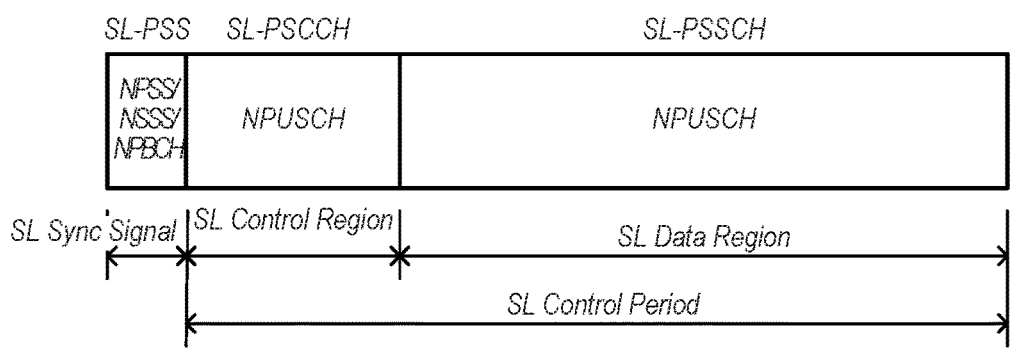
Figure 11:
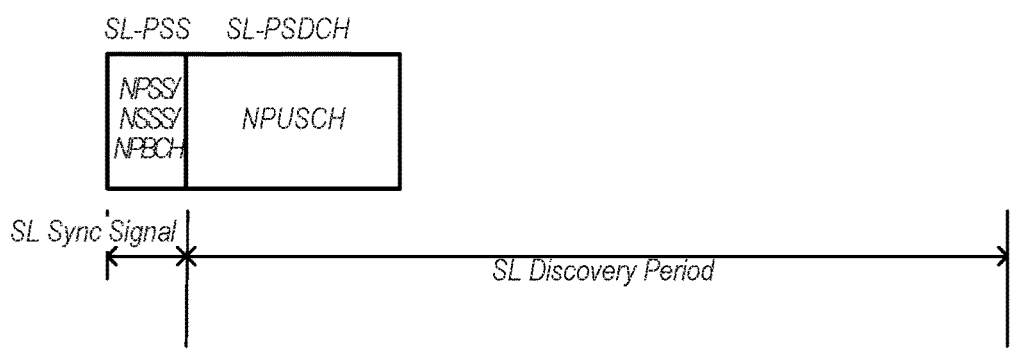
Figure 12:
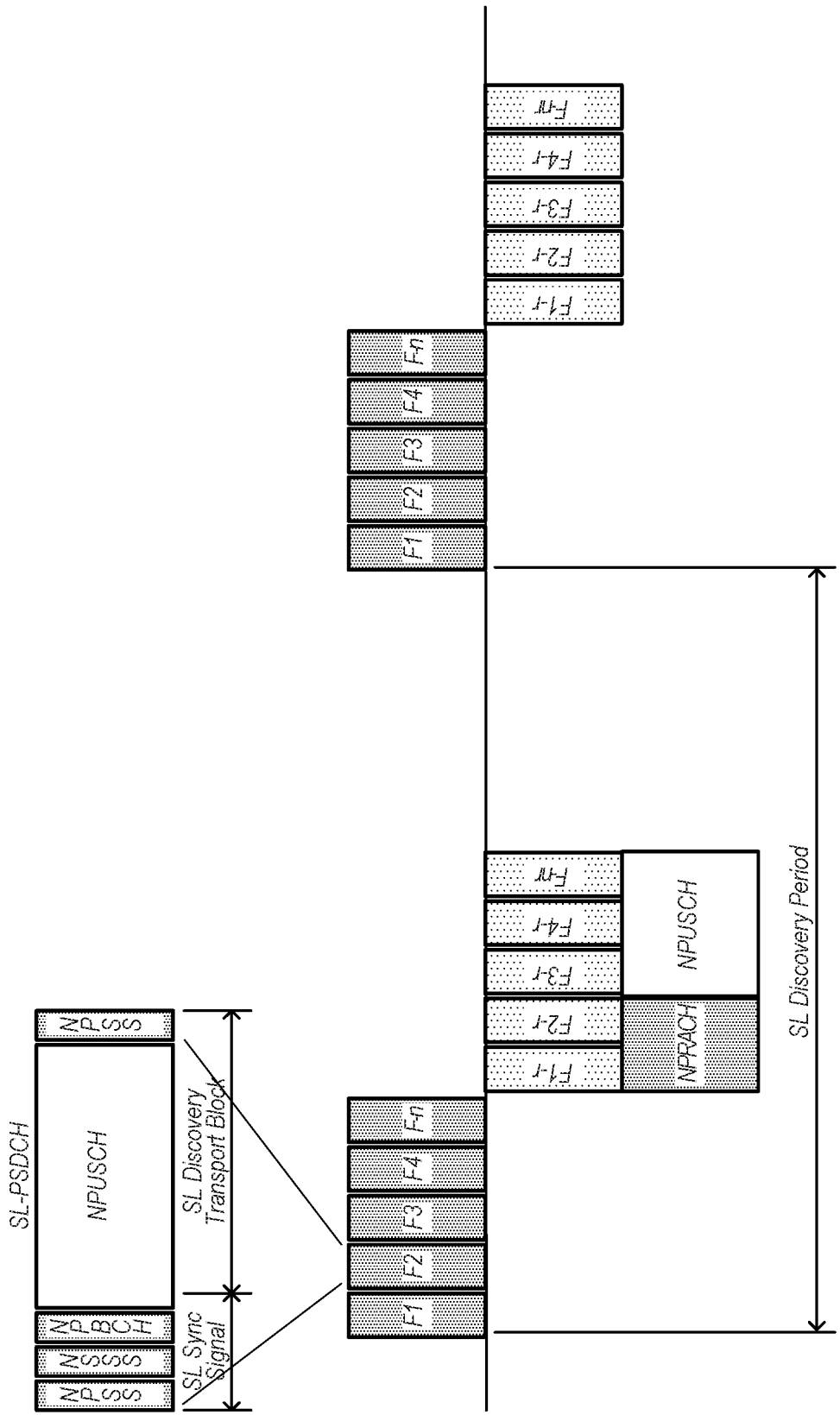

Since each UE may have it's own local clock K_Native, it may be helpful to provide synchronization signals prior to each discovery (and possibly also control/data) communication in the OGRS system. FIGS. 10-11 illustrate such control/data and discovery communications including sync signals that may be used as preambles.

According to some embodiments, narrowband primary synchronization signals (NPSS) and narrowband secondary synchronization signals (NSSS) may be used for the sidelink synch signals. As one possibility, a variable number of repetitions of the NPSS may be used, with each repetition including 14 OFDM symbols in one subframe, and each OFDM symbol having the same length 11 Zadoff-Chu (ZC) sequence with a root index u, with the ZC sequence mapped to the 12 subcarriers of the NB-IoT physical resource block (PRB). Different root index u values for the NPSS can be used to indicate different numbers of repetitions of the sidelink sync signal. For example, a root index u could be used to indicate no repetitions are used (e.g., just one transmission of the sync signal is provided), a root index u+1 could be used to indicate that 4 repetitions are used, a root index u+3 could be used to indicate that 8 repetitions are used, etc. Other schemes for indicating the number of repetitions are also possible.

The NSSS subframe may have a length 132 ZC sequence with a root index value v. 4 different phase cyclic shifts of the ZC sequence may be applied, e.g., to each even frame in an 8 frame period. Different root index values for v (e.g., v, v_1, . . . , v+128) can be used to identify the UE performing the transmission, and potentially also for indicating the discovery transmission frequency hopping sequence.

The sync signal may also include a certain number of repetitions of a physical broadcast channel (PBCH) subframe, which may indicate the current subframe and frame number according to the UE providing the sync signal.

As illustrated in FIG. 10, for control/data communications, the sidelink control region may be transmitted as NB-IoT format N0 (23 bits) using a narrowband physical uplink shared channel (NPUSCH). A fixed transport block configuration may be used, such as 15 kHz single tone BPSK. The control region may indicate the data format for the sidelink data region, such as a subcarrier indication (e.g., 15 kHz/3.75 kHz subcarriers, 1, 3, 6, or 12 tones), a resource assignment (e.g., a number of resource units), a modulation and coding scheme, a redundancy version, a repetition number, and a new data indicator. The sidelink data region may be transmitted as NB-IoT NPUSCH data subframes, with resources, MCS, and repetitions indicated by the sidelink control region.

As illustrated in FIG. 11, for discovery communications, the discovery message portion of a sidelink discovery transport block may also be transmitted on an NB-IoT NPUSCH, and may occupy a portion of each sidelink discovery period. As further illustrated in FIG. 12, each discovery period may include a discovery transmission period and a discovery response reception period. Each discovery transmission period may includes a certain number of repetitions n of each discovery transmission, e.g., corresponding to the number of frequencies on the scan or paging channel on which discovery is being performed. Each transmission may be performed on a different frequency of the set of frequencies of the scan/page channel. The scan/page frequency sequence used may be based on the discovering UE's MAC address, and may be indicated by the NSSS root index value v.

One discovery transmission may include a certain number of repetitions of each of the NPSS subframe, the NSSS subframes, and the NPBCH subframes. The repetitions may be clustered or may be distributed among the transmission period, according to various embodiments. One discovery transmission may further include the discovery message portion, which as previously noted may be transmitted using NPUSCH. A fixed transport block configuration may be used, if desired. For example, as one possibility, a 15 kHz single tone, QPSK modulation, 256 bits size configuration may be used, with 3 resource units (RUs), each RU including 8 ms with 16 slots, each slot including 7 OFDM symbols, such that the discovery message portion may be 24 ms long. The discovery message portion may indicate the super-frame number according to the local clock of the discovering UE, the advertising source MAC address, the advertising target (individual user or group) MAC address, a bitmap indicating a frequency map used for hopping by the discovering UE, and/or any other desired information.

The discovery response reception period may be after the discovery transmission period. In this period, the discovering UE may monitor a sequence of frequencies selected from the OGRS frequency pool based on the discovery device's MAC address, with each frequency monitored for a specified number of frames (e.g., for one frame).

If a UE is discovered (e.g., the UE receives a discovery transmission and is a target of the discovery transmission), the UE may perform a discovery response transmission during the discovery response reception period. From the received discovery message, the UE may be able to find out the frequency hopping sequence the discovering UE is using in its discovery response reception period, e.g., based on the UE MAC address, super-frame number, and frame number of the discovering UE, and may transmit its discovery response message over the determined frequency hopping sequence.

According to some embodiments, the discovered UE may estimate the number of repetitions of the discovery response message that the discovering UE may need to successfully decode the discovery response message. For example, the estimate may be based on any or all of the RSRP/RSRQ of the primary synchronization signals, secondary synchronization signals, master information block, and discovery message, and/or based on the number of repetitions needed by the discovered UE to decode the MIB and the discovery message.

The discovered UE may utilize a narrowband physical random access channel (NPRACH) preamble as part of the discovery response transmission. The NPRACH preamble may include 4 PRACH symbol groups, each group having 1 cyclic prefix and 5 PRACH symbols transmitted on one 3.75 kHz subcarrier, for a total preamble length of 5.6 ms. The PRACH preamble used and the number of PRACH repetitions may be selected based at least in part on the estimated number of repetitions of the discovery response message that the discovering UE may need to successfully decode the discovery response message. If desired, a root index value for the PRACH preamble may be used to indicate the number of repetitions used to the discovering UE.

The discovery response message may be provided on an NB-IoT NPUSCH, and a number of repetitions of the discovery response message may also be selected based at least in part on the estimated number of repetitions of the discovery response message that the discovering UE may need to successfully decode the discovery response message. The content of the discovery response message may include the MAC address and local clock of the discovered UE, e.g., for a tracking response. Additionally or alternatively, for establishing a connection with the discovering UE, the discovered UE can send a connection request message as part of the discovery response message.

If desired, the discovering UE may respond to the discovered UE with a PRACH ACK after the discovered UE provides the PRACH preamble, and prior to providing the discovery response message itself.

According to some embodiments, multiple UEs may be paired into an OGRS group, e.g., over another existing communication link (e.g., cellular/Wi-Fi/Bluetooth), if available. When forming such a group, each UE may be assigned a OGRS MAC address, and its OGRS K_native may be re-initiated to a random value. Each UE may maintain a list of the other UEs MAC addresses and K_native offsets relative to its own K_native. During the period when such an OGRS group is established, a UE's K_native offset may be (e.g., periodically) updated based on message(s) received from the UE. Such updates may be provided over OGRS (e.g., in the course of communications once a connection is established, or using discovery techniques such as described herein), or over another existing communication link, if available. If no K_native offset has been updated for a UE within a certain amount of time, that K_native offset may be considered out of date (e.g., as clock drift may result in the previously stored K_native offset becoming stale/inaccurate).

Using such a framework, if a UE wishes to send data to (or track) another UE, if the UE's local cache does not have the UE's K_native offset or if it is out of date, the UE may start a discovery procedure on UE's scan channel or on a group page channel including the target UE. During the discovery transmission period, the UE may transmit a discovery message on each frequency of the set of frequencies of the scan/page channel. If the UE's local cache does have the UE's fresh K_native offset, the UE may start a discovery procedure on the UE's page channel. In this case, the UE may align its discovery transmission period to the other UE's receiving time, and may transmit a discovery message on 3 frequencies around the page frequency (F_left, F_page, F_right).

Figure 13:
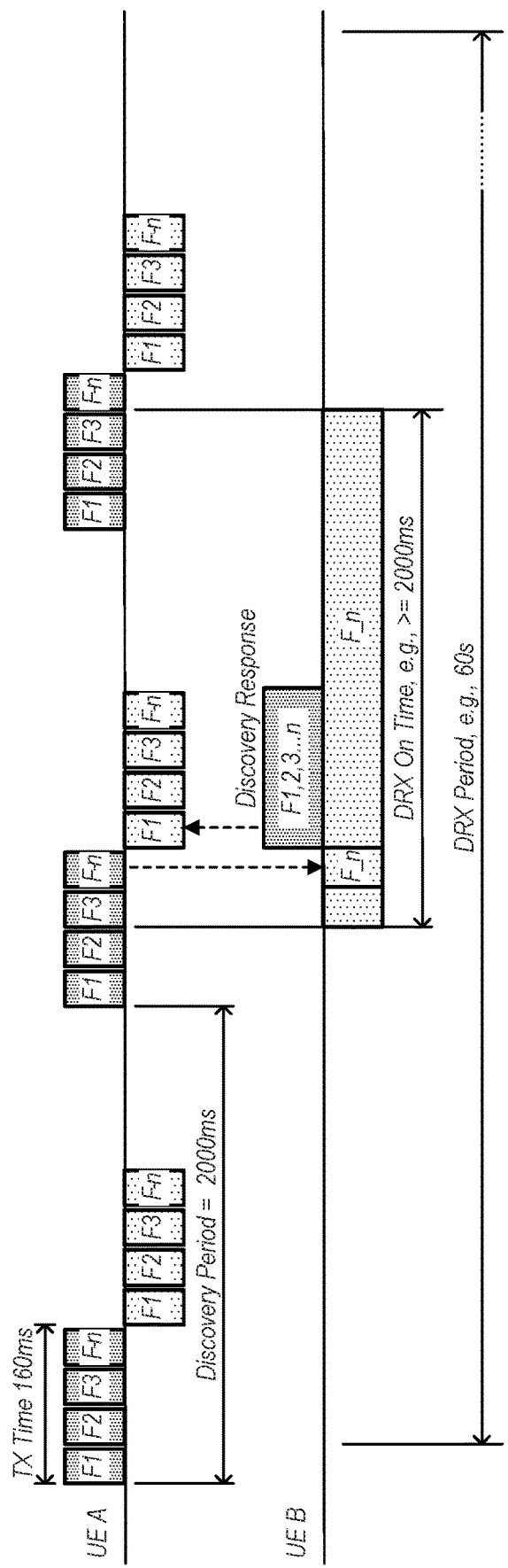

FIG. 13 further illustrates how such a discovery process could occur. In the illustrated example scenario, UE A may be the discovering UE, while UE B may be a discovered UE. UE A may start a discovery timer having a value that is at least the length of the DRX period used by UEs monitoring scan/page channels. For example, in the illustrated example, a DRX period of 60 s may be used, and a discovery timer of 2*60 s=120 s may be used. In each discovery period (e.g., 2000 ms in the illustrated example), UE A may send a discovery message transmission repetition on each discovery frequency of its discovery transmission frequency sequence; for example, if 4 hopping frequencies are used, and each discovery message transmission is 40 ms, the discovering UE may transmit for 160 ms out of each 2000 ms discovery period. UE A may then switch to receiving on a discovery response frequency sequence (which may be the same as or different than the discovery transmission frequency sequence). If a preamble is detected, UE A may continue decoding the control portion of the message, then the data portion. If the response message is a discovery response for tracking, the UE A may save the discovered UE's MAC address and the offset of its K_native to UE A's K_native. If the response message is a connection request message, the UE A and the UE B may form a connection. In forming the connection, the discovering UE or the discovered UE may take the role of master, with the other taking the role of slave and synchronizing to the master's timing. For example, if the discovering UE is to be master, the UE A may send an ACK in response to the discovery response message to confirm the connection is established, and UE B may sync to UE A's timing. If the discovered UE is to be master, the UE A may sync to UE B's local clock and frequency (e.g., based on UE B's MAC address) and then may send an ACK in response to the discovery response message.

During its page/scan DRX wakeup time, UE B may search on a RX frequency F_n, which may be selected based on UE B's K_native. Based on NPSS/NSSS detected on F_n, UE B can know the TX frequency sequence of the UE A's discovery transmission period, based on which UE B can also tune to the other TX frequencies, if desired, e.g., to combine sync signals, NPBCH, and discovery message from multiple transmissions. If a NPSS is detected, but the signal strength and/or quality (e.g., SNR) is too low to decode the discovery message, the UE B may combine the NPSS/NSSS/NPBCH/discovery message(s) from the next discovery period(s), until the signal strength and/or quality is sufficient to decode, or possibly until a configured maximum number of combinations is reached.

If a NPSS is detected, and signal strength and/or quality are good enough to decode the discovery message, and if the UE B is a target for the UE A's discovery, based on the signal strength and/or quality and/or number of repetitions/combinations needed to decode the NPSS/NSSS/NPBCH/discovery message, UE B may determine a number of repetitions needed for the discovery response message, and may send the discovery response message. If the response is for tracking, the discovery procedure may at this point be complete. If the response is for establishing a connection, the response may include a connection request message, and UE B may wait for an ACK from UE A.

At least in some instances, other UEs may also utilize UE A's discovery signals. For example, if a third UE (UE C) intends to discover the same UE(s) as UE A, UE C may be able to sync to UE A's timing, and listen to the discovery responses, thereby obtaining MAC address and K_native offset information for such devices.

Alternatively, if UE C's intent is to discover UEs different from UE A, UE C can send its own discovery messages, e.g, at the same time locations as UE A, if the discovery transmission frequency sequence for UE C is different than for UE A, or on a different time location than UE A, if the discovery transmission frequency sequence for UE C is the same as for UE A.

Figure 14:
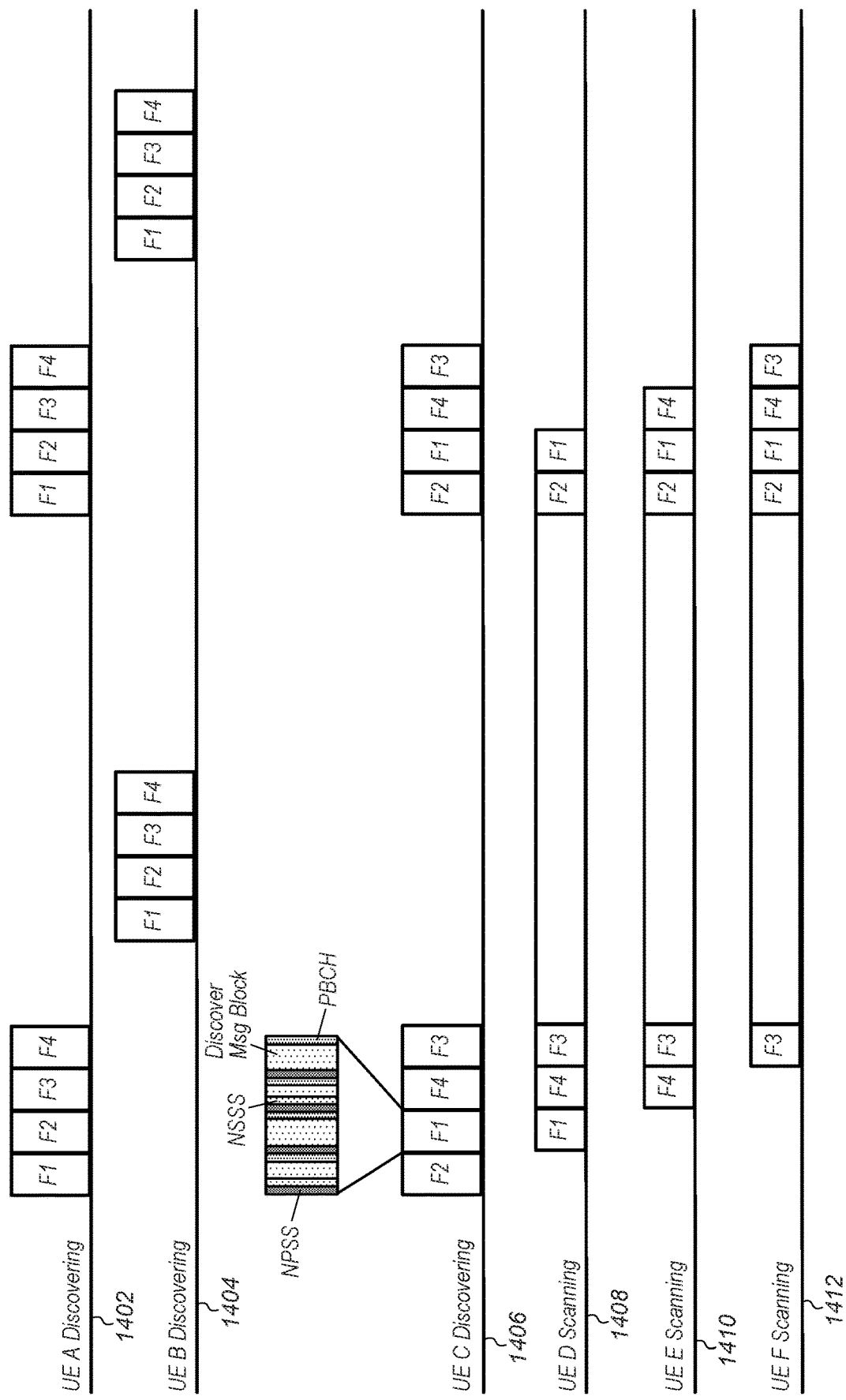

For example, FIG. 14 illustrates a further exemplary scenario, in which a UE A 1402 is discovering using a first discovery transmission frequency sequence at the same time that a UE C 1406 is discovering using a second discovery transmission frequency sequence. A UE B 1404 may also be discovering using the first discovery transmission frequency sequence, but at a different time than UE A.

Meanwhile, UE D 1408 may be scanning on F1 during the waking portion of its DRX operation, and may detect the discovery transmission of UE C. Subsequently, UE D may determine the discovery transmission frequency sequence in use by UE C, and follow that frequency sequence to receive further repetitions of the discovery transmission of UE C, e.g., both in the remainder of the same discovery period and potentially again in the next discovery period.

UE E 1410 may similarly be scanning, but on F4, and with different timing for the waking portion of its DRX operation relative to UE D. Nonetheless, UE E may also be able to determine the discovery transmission frequency sequence in use by UE C, and follow that frequency sequence to receive further repetitions of the discovery transmission of UE C, e.g., both in the remainder of the same discovery period and potentially again in the next discovery period.

UE F 1412 may also similarly be scanning, but on F3, and also with different timing for the waking portion of its DRX operation relative to UE D and UE E. Also similarly, UE E may be able to determine the discovery transmission frequency sequence in use by UE C, and follow that frequency sequence to receive further repetitions of the discovery transmission of UE C, e.g., in the next discovery period, since the discovery transmission received by UE F on F3 may be the last repetition transmitted by UE C during that particular discovery period.

Note that a UE may periodically hop to a different frequency to scan (e.g., among the frequencies of a scan channel, or to a frequency of a different scan channel), if desired. For example, as one possibility, after a certain number of DRX cycles spent scanning one frequency of a scan channel during waking periods, a UE may switch to scanning a next frequency of the scan channel during waking periods, and may continue such a progression as desired, e.g., to increase frequency diversity.

As previously noted, a P2P connection may be established between a master and a slave. There may be multiple options for choosing the master role. As one possibility, the discovering UE may become the master, in which case the discovered UE may become the slave, and may sync to the master's timing. In this case the discovered UE may respond to a discovery message with a connection request message, and may wait for an ACK from the master to confirm the connection establishment. The ACK message may act as the first anchor point for the P2P connection, and may indicate an anchor point periodicity to be used for the P2P connection.

As another possibility, the discovered UE may become the master. In this case, the discovered UE may respond to a discovery message with a connection request message in accordance with the discovering UE's timing, then the discovering UE may sync to the discovered UE's timing and frequency hopping sequence, and may send an ACK to the discovered UE to confirm the connection establishment. In this case, since the discovered UE is becoming the master, the connection request message provided as the discovery response may include an indication of the master's MAC address and local clock, as well as an indication of the anchor point periodicity to be used for the P2P connection.

Note that it may be possible for multiple UEs to be slaves of one UE master, such that all slaves use the master's MAC address and clock K_native for frequency hopping. In such a case, the first data PDU sent by the master to a slave may mark the first anchor point, and thus define when the master must periodically send a PDU to the slave to maintain the connection. Transmissions between the master and slave may alternate, e.g., such that the master may send one PDU to the slave, then the slave may send one PDU back to the master (e.g., with ACK/NACK), then the master may send one PDU to the slave (e.g., with ACK/NACK), etc. Each PDU may include a sync signal, control region, and data region, and the sync signal root index value may indicate the length of the sync signal, e.g., as previously described herein.

In order to be relatively efficient in terms of power, repetitions, and delay between master and slave, both master and slave may provide feedback to each other, e.g., with respect to any or all of ACK/NACK indications, TX power control, estimated length for sync signal, control region, and data region, etc. Such feedback can be based on block error rate (BLER) and/or signal strength/quality (e.g., RSRP/RSRQ) measurements for received PDUs, according to some embodiments.

Note also that at least according to some embodiments, either or both of a master or a slave in a P2P connection may be able to send discovery messages and/or scan on page and/or scan channels, and multiple P2P connections can be established between multiple UEs.

According to some embodiments, UEs may utilize listen before talk (LBT) techniques, e.g., by searching for sync signals for a certain amount of time before attempting to transmit. For example, if a UE receives a sync signal with a SNR higher than a configured threshold during an LBT window prior to a transmission, the UE may delay its transmission until a later opportunity (e.g., when no conflicting communication is occurring).

FIGS. 15-25 and Additional Information

FIGS. 15-25 and the following additional information are provided as being illustrative of further considerations and possible implementation details relating to a possible D2D communication framework, and are not intended to be limiting to the disclosure as a whole. Numerous variations and alternatives to the details provided herein below are possible and should be considered within the scope of the disclosure.

One possible approach to providing synchronization within a D2D communication framework may include a set of devices in a geographical area synchronizing to the symbol/subframe/frame timing and carrier frequency provided by one of the devices, which may be referred to as a synchronization master, as a 'global' synchronization source, or in any of various other manners. This approach may be similar in at least some ways to a cellular network in which wireless devices in a given area may camp on a base station, and may also be referred to herein as a 'global' synchronization approach.

Conceptually, a D2D communication service may be able to enable communication between any two wireless devices as long as can communicatively reach each other according to the geographical distance between them. However, such a global synchronization approach may result in devices' coverage range being limited by the synchronization master's range, such that it may be possible for two devices to not be able to communicate despite being within communication range from each other if one is within the sync master's range and the other is out of the sync master's range. Even if a sync relay system is used to extend the range of a D2D group, practical sync hop limits (e.g., 2, or any other sync hop limit) may still result in a node's discovery range being restricted to the sync range, such that two devices in close proximity may still not be able to communicate, e.g., near the boundary of a relay master.

Further, it may also be possible for two devices to be within communication range from each other, but to be synchronized to different sync masters with different synchronization schemes. For example, nodes synchronized to masters with different timing sources (e.g., GNSS vs. non-GNSS, or non-GNSS vs. non-GNSS) may not be able to communicate with each other despite being within geographical range.

Such an approach may also suffer from inconsistent and/or substantial peer to peer connection setup delays. For example, even though two devices might be in close proximity to each other, they might experience a relatively long connection setup delay, if they are at the edge of the coverage provided by a sync master, e.g., due to longer synchronization time.

Additionally, such an approach may result in an additional power consumption burden upon the device selected to be the synchronization master, e.g., since it may be expected to transmit synchronization reference signals at a high power level to provide a maximum possible range for the D2D communication group. Such a burden may be distributed among devices, e.g., by rotating the sync master position among devices. However, this may introduce communication interruptions, extend connection setup delay/discovery latency among devices, require a more complex synchronization system design in order to provide for event driven and/or periodic triggered master/relay selection/re-selection/handover between different sync sources, and/or have potential for instability due to such a complex multi-tier sync design. Further, relying on an unrelated sync master device to provide synchronization introduces an additional possible source for potential unexpected behavior that could affect D2D communication between a pair of devices.

Still further, such a system may have a potentially substantial likelihood for collisions during discovery, e.g., since many devices may sync to the same timing and frequency scheme provided by a sync master.

Additionally, in possible scenarios in which GNSS based timing is preferably used by the sync masters in a global synchronization approach, such GNSS sync masters may be highly dependent on GNSS availability and accuracy (e.g., to within 8 ms, as one possibility), which may be an unrealistic requirement in some possible use cases (e.g., hiking in wilderness, in some instances). This can lead to more frequent sync master handovers in GNSS coverage, if available, and may otherwise lead to fallback to a non-GNSS based timing, which may exacerbate situations in which wireless devices in close proximity cannot communicate with each other.

Accordingly, as a possible alternative, a D2D communication framework utilizing a synchronization scheme that does not rely on a sync master device to provide synchronization signals for an entire D2D communication group may be used, at least according to some embodiments described herein. Such a possible framework may include any of a variety of framework elements and procedures, including any or all of frequency hopping, idle procedures, peer and/or presence discovery procedures, UTC time update procedures, P2P communication procedures, physical layer preamble sequences and packet structure, discovery collision mitigation/handling, and/or any of various other framework elements and procedures, as described further subsequently herein.

Figure 15:
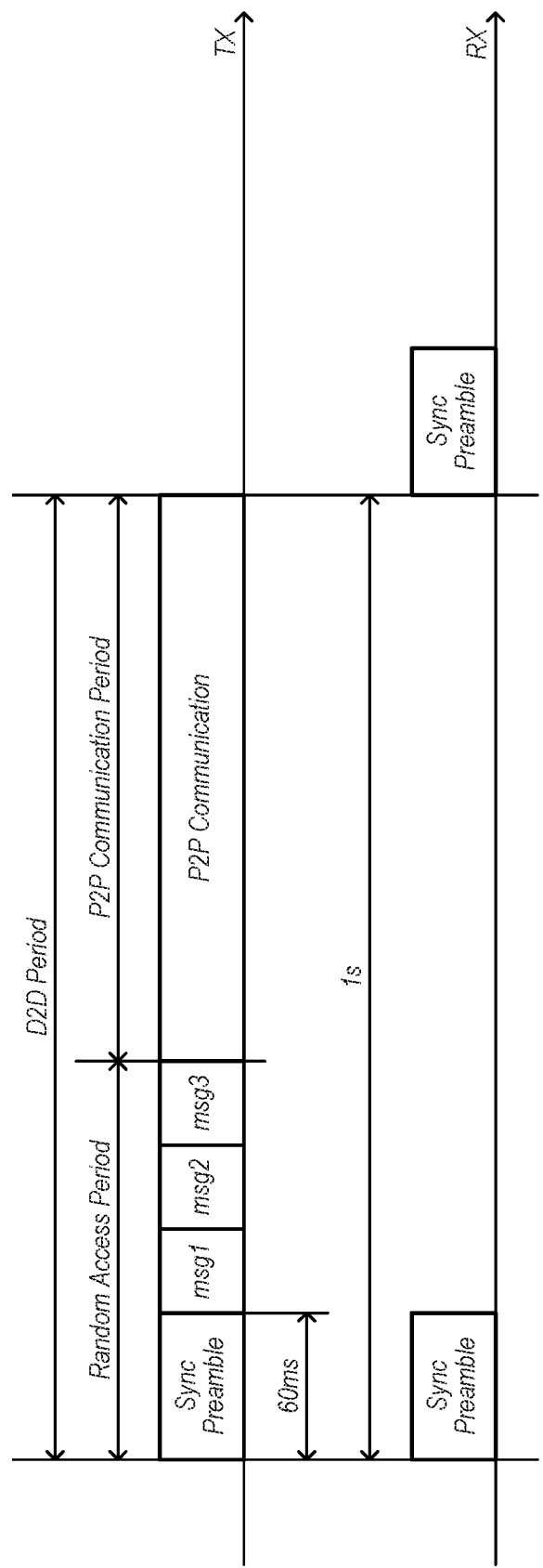

FIG. 15 illustrates a possible frame structure that could be used in conjunction with such a D2D communication framework, according to some embodiments. As shown, an overall D2D period may include a random access period and a P2P communication period. Within the random access period, it may be possible for devices to transmit sync preamble, msg1, msg2, and msg3, e.g., to perform synchronization and discovery. In the P2P communication period, devices that have performed synchronization and discovery and agreed to communicate during the random access period may perform P2P communication, e.g., to exchange data.

At least according to some embodiments, each D2D period may last for 1 second and may be synchronized with coordinated universal time (UTC), e.g., as may be acquired by each D2D capable device via a global navigational satellite system (GNSS) and/or in any of various other ways. The portion of the random access period in which sync preambles are transmitted may be configured to consistently occur during a certain portion (e.g., up to the first 60 ms of each D2D period, as illustrated, as one possibility) of each D2D period. This may allow an idle D2D wireless device to utilize a discontinuous reception (DRX) technique to listen for sync preambles during that certain portion of each D2D period and to conserve power (e.g., by sleeping/reducing power to certain device components) for the remainder of each D2D period if there is no sync preamble directed to the idle D2D wireless device.

Figure 16:
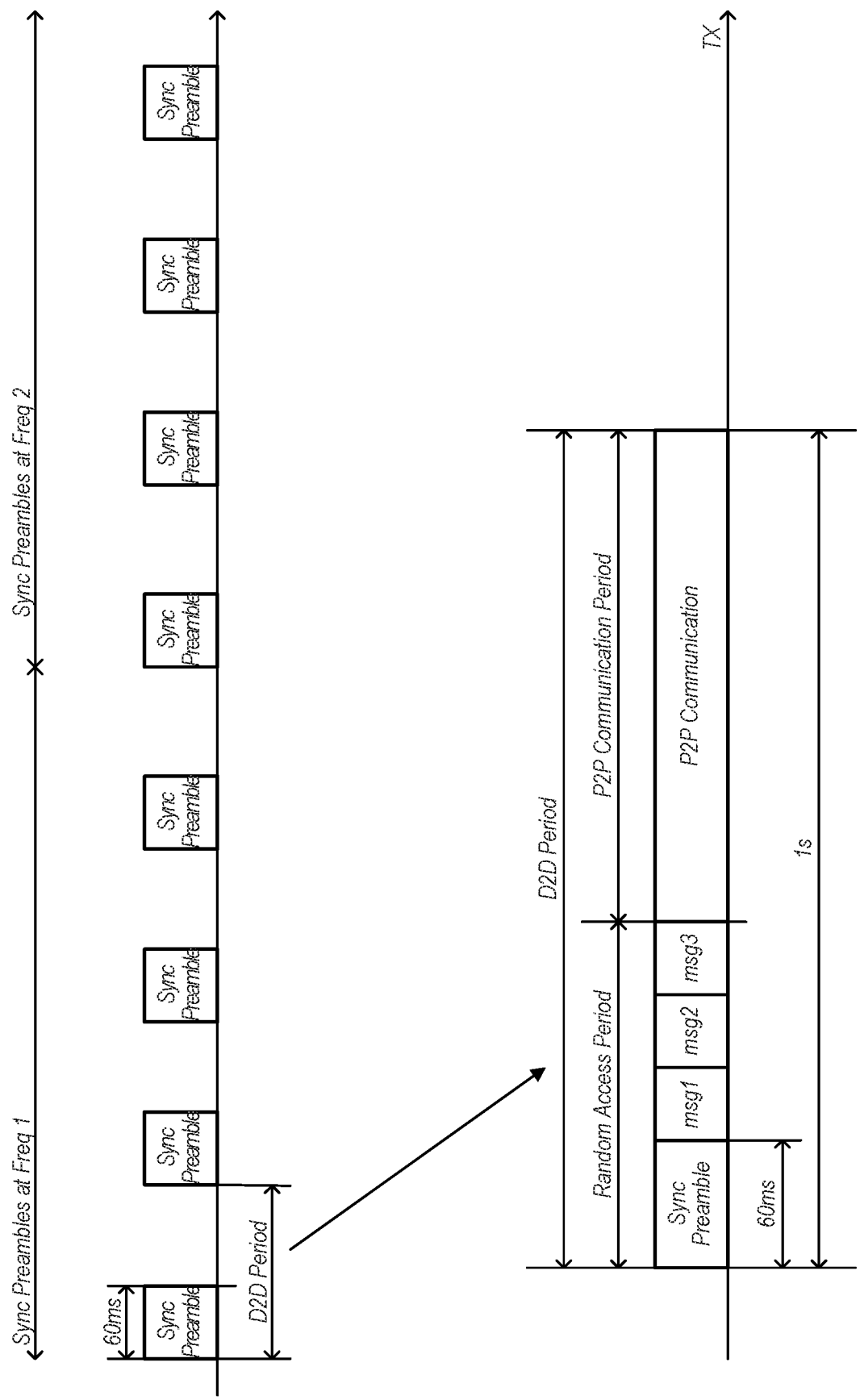

According to some embodiments, the frequency used for sync preamble transmissions may hop periodically. For example, as illustrated in FIG. 16, sync preambles may be transmitted at a first frequency for a certain number (N) of D2D periods (e.g., with N=4 as one possibility, as shown), then at a different frequency for a certain number of D2D periods, and so one, through a configured progression of sync preamble frequencies.

Further, if desired, the frequencies and/or scrambling codes used for msg 1, msg 2, and msg 3 communications may be individually selected, e.g., based on the current sync preamble's frequency, type, and sequence, and the frequencies may differ from the frequency used for the sync preamble. The frequencies used for P2P communication during the P2P communication period may exclude the frequencies used by the current sync preamble, msg 1, msg 2, and msg 3, if desired. A P2P frequency hopping sequence for this period, and/or a scrambling code or codes for this period, may be based on the clock of the master peer and a P2P link ID derived from both peers' UE IDs.

Such individualized frequency selection may help reduce the likelihood of collisions between devices during discovery and data communications, e.g., due to the number of possible PHY sync IDs, the multiple possible preamble sequences for each PHY sync ID, the multiple types of possible preamble sequences, etc.

Figure 17:
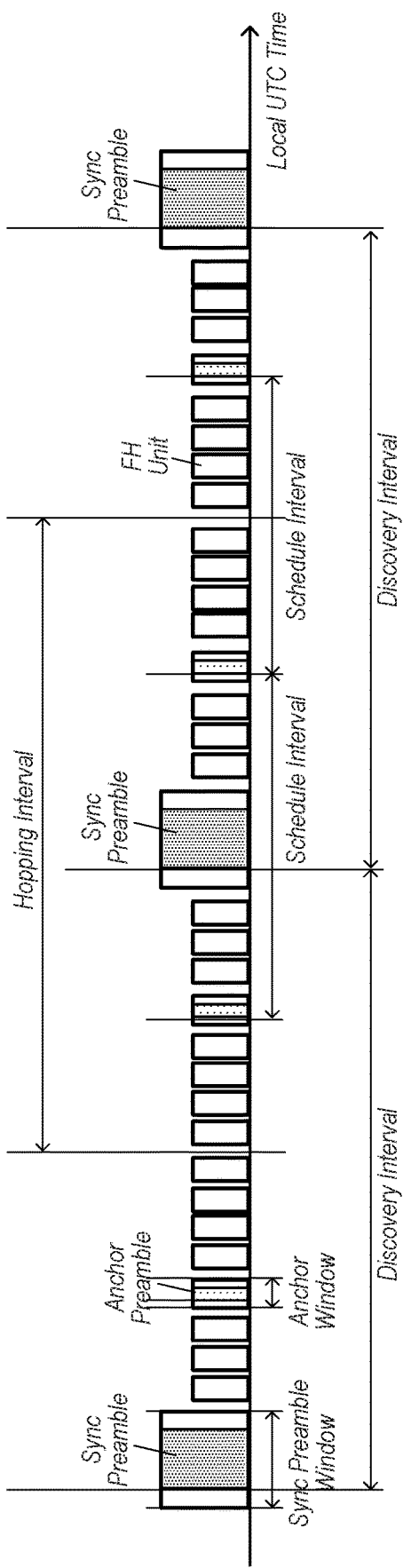

Additionally or alternatively, FIG. 17 illustrates another possible interval structure that could be used for a synchronization preamble based framework for P2P communication. According to the illustrated interval structure, the overall time line structure may be based on UE local UTC time, composed of regular discovery intervals. Each discovery interval may have a predefined length (e.g., 720 ms, or any other desired length), and may have a start time based on a common UE ID that is known system-wide (or at least group wide). A hopping interval may have the same length as the discovery interval, and may have a predefined offset from the discovery interval (e.g., 360 ms, or any other desired offset).

As shown, the discovery interval may include 3 types of time resources: sync preambles, anchor preambles, and frequency hopping units (which may include one or multiple resource units).

Each sync preamble may have a predefined length (e.g., 50 ms, or any other desired length), and may be a Zadoff-Chu based preamble used for initial sync and data access for a new data session started with a discovery interval, without prior synchronization, according to some embodiments. In other words, a sync preamble may be transmitted by a UE at the start time of a discovery interval to start a new data session without prior synchronization. Some common sync preambles may be predefined for broadcast type services, such as presence discovery. A UE may also have its own dedicated sync preambles, which may hop at each hopping interval based on UE ID and UE local UTC time. For example, a pool of sync preambles may be divided into a certain number of groups (e.g., each associated with a sync ID), with each group including a certain number of synchronization sequences. A common sync ID set may thus have several sync IDs for common use, and a dedicated sync ID set may thus have the rest of the sync IDs that can be used for individual UEs. In such a case, the UE sync preamble hopping at each hopping interval may be among the dedicated sync ID set associated with the UE based on the UE ID and UE local UTC time. The frequency used for transmitting the sync preamble may also hop at each hopping interval based on UE ID and UE local UTC time.

The sync preamble window may be used for receiving a sync preamble transmitted by another UE. There may be multiple (e.g., 3, or another number) types of sync preamble windows, according to some embodiments. For example, a normal sync preamble window may be aligned with the start of a discovery interval, but with +/− normal drift room (e.g., 15 ms, which may correspond to up to 60 minutes out of GNSS coverage if UTC accuracy is 5 ppm, as one possibility; other values are also possible). The length of the normal sync preamble window may be equal to the sync preamble length plus double the normal drift room, as one possibility. A long sync preamble window may be a sync preamble window similarly aligned with the length of the discovery interval plus double the normal drift room. An extended sync preamble window may be a sync preamble window extended to multiple lengths of the discovery interval. For example, the length may be a number of multiples of the length of the discovery interval equal to a number of days that a UE has been out of GNSS coverage, as one possibility. Other values are also possible.

An anchor preamble may be a Zadoff-Chu based reference signal (e.g., including N repetitions of a ZC sequence, as one possibility among various possibilities) used for synchronization tracking and data access. An anchor preamble may be transmitted at the start time of a schedule interval to start a new data session with a UE with which synchronization has already been performed. According to some embodiments, an anchor preamble may be scrambled with a gold sequence based on UE ID and link ID. The sequences used for the anchor preamble can hop among a set of such sequences at each hopping interval, e.g., based on UE ID and UE local UTC time. The schedule interval may be the shortest configured packet exchange session length between peer UEs, according to the framework of FIG. 17, at least according to some embodiments. It may include a number of frequency hopping units, each of which may include one or multiple resource units. A data packet may span one or multiple frequency hopping units. A frequency hopping unit may the time unit for frequency hopping in a hopping interval. A resource unit may be a resource allocation unit as specified according to NB-IoT.

As previously noted, in the interval structure of FIG. 17, frequency hopping may be used at certain intervals. According to some embodiments, a system deployed according to such a framework may include a certain number of frequency channels (e.g., 63, as one possibility, or any other desired number), which may be randomly re-sequenced in every regular hopping interval based on the common UE ID and the local UTC time. A first group of frequencies according to the sequencing (e.g., 13, or any other desired number) may be used for sync preamble and msg1 transmissions. For example, the 1st frequency in the sequence may be used for sync preamble transmission, and a frequency from the remaining frequencies in the group may be selected for msg1 transmission based on the sync preamble sequence used. The remaining frequencies (e.g., a second group of frequencies, which may include 50 frequencies in a system with 63 total frequencies and 13 frequencies in the first group, or any other desired number of frequencies) may be used for frequency hopping among FH units in a discovery interval. A frequency hopping sequence for hopping among the second group of frequencies may be determined by UE ID and local UTC time, according to some embodiments. Note that a schedule interval may be shared by one clock master and one clock slave, such that FH units in a schedule interval may follow the clock master's FH sequence, and the clock slave UE follows the clock master's timing and FH sequence for transmission and reception. Different schedule intervals can have the same or a different clock master and slave pair, at least according to some embodiments.

Note also that a scrambling code may be used in conjunction with msg1 transmission, at least according to some embodiments. The scrambling code for the msg1 may be selected based on the sync preamble sequence in response to which the msg1 is transmitted. The scrambling code used on other discovery communications (e.g., msg2, msg3, msg4) may be based on the clock master's UE ID and the link ID assigned by the clock master.

Figure 18:
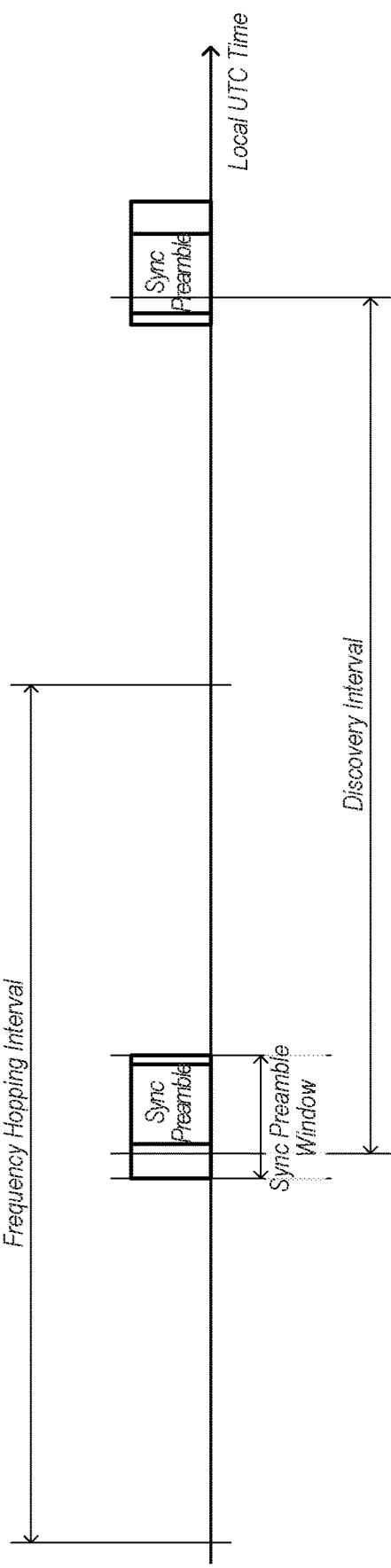

FIG. 18 further illustrates possible idle procedure aspects of such a framework as illustrated in FIG. 17, according to some embodiments. As shown, a UE in idle mode may perform a periodic search for related sync preambles in a normal sync preamble window, in every discovery interval, e.g., in order to receive sync preambles from UEs with UTC time difference from local UTC time of less than or equal to twice the normal drift room (e.g., up to 60 minutes out of GNSS coverage, if the normal drift room values discussed previously herein are used, according to some embodiments).

Additionally, a UE may be configured to perform a periodic search for detectable sync preambles in a long sync preamble window, once in every X (where X may be any desired number) discovery intervals, e.g., in order to receive sync preambles from UEs with UTC time difference from local UTC time of greater than twice the normal drift room and less than or equal to the discovery interval length. Still further, a UE may initially and/or periodically perform a search for detectable sync preambles in an extended sync preamble window of X discovery intervals, once in every Y (where Y may be any desired number, e.g., greater than X) discovery intervals, e.g., in order to receive sync preambles from UEs with UTC time difference from local UTC time of greater than the discovery interval length and less than or equal to X discovery intervals (e.g., up to 2 days out of GNSS coverage, according to one possible configuration).

As noted previously herein, according to some embodiments, a wireless device participating in such a D2D communication scheme may be assigned a physical layer (PHY) synchronization identifier (sync ID), which may have a certain length (e.g., 7 bits, or any other desired length). The sync ID may be derived from a longer (e.g., 16 bytes) UE ID and a (e.g., 8 bit) hash ID, as one possibility. The PHY sync ID may represent a group of dedicated preamble sequences associated with the wireless device. One or more common preamble sequences may also be configured, e.g., for indicating certain common discovery messages. Thus, if 7 bit PHY sync IDs are used, 125 PHY sync IDs may be possible, representing 125 preamble groups. If each group is provided with 4 sequences, and 4 common sequences are provided, a total of 504 preamble sequences may be configured.

The sync preamble sequences may be used for initial symbol timing correction and carrier frequency offset (CFO) correction, as well as for sync preamble type detection (e.g., if applicable), and for PHY sync ID detection. FIG. 19 illustrates a sync preamble transmission within a sync preamble window of a discovery interval such as illustrated in FIG. 17. A wireless device that detects a preamble during such a D2D period may be able to determine if the preamble is a common preamble or one that is associated with its PHY sync ID (e.g., in which case the wireless device may further listen for one or more discovery messages) or is associated with another PHY sync ID (e.g., in which case the wireless device may continue DRX for the remainder of the D2D period).

In some instances, there may further be multiple types of sync preambles, such as a long sync preamble (e.g., 60 ms) that may be used for long range communication (e.g., MCL up to 164 dB, as one possibility) and a normal sync preamble (e.g., 20 ms) that may be used for normal range communication (e.g., MCL less than or equal to 155 dB, as one possibility). FIG. 20 illustrates how multiple such sync preamble types might fit within a sync preamble window of a discovery interval, according to some embodiments.

In some instances in which multiple sync preamble lengths are possible, a wireless device may be able to utilize sync preamble length adaptation. For example, with prior knowledge (e.g., a previous link with certain power occurred a certain amount of time ago, such that power and/or recency are within configured thresholds), a UE may be configured to start discovery with a 'normal' sync preamble, and with power levels up to a certain threshold (e.g., 26 dBm, or any other desired power level threshold). Without prior knowledge (or with knowledge of a previous link that does not meet configured requirements for the 'normal' sync preamble), the UE may be configured to start discovery with a 'long' sync preamble, and with power levels up to a certain (e.g., higher) threshold (e.g., 30 dBm, or any other desired power level threshold). Note also that other types of sync preambles, with different associated communication ranges and/or other characteristics, are also possible.

As one possibility for providing preamble sequences, a design similar to NB-IoT PSS/SSS subframe design may be possible. For example, N repetitions of NB-PSS subframes followed by M repetitions of NB-SSS subframes may be provided as a preamble sequence, as one possibility. With NB-PSS OFDM symbols having length 11 ZC sequence with root u (e.g., u=1, 2, 3, 4, 5, 6, 7, 8, 9, 10) and with a short cover code, and a NB-SSS subframe carrying one length of 131 ZC sequence with 126 roots and multipled with 4 length of 128 m-sequences, a total of 126×4=504 preamble sequences may be possible. If desired, a normal preamble may be constructed using such components with N=15, M-5, and u=5 for a 20 ms preamble, and a long preamble may be constructed with N=50, M=10, and u=3 for a 60 ms preamble.

Figure 21:
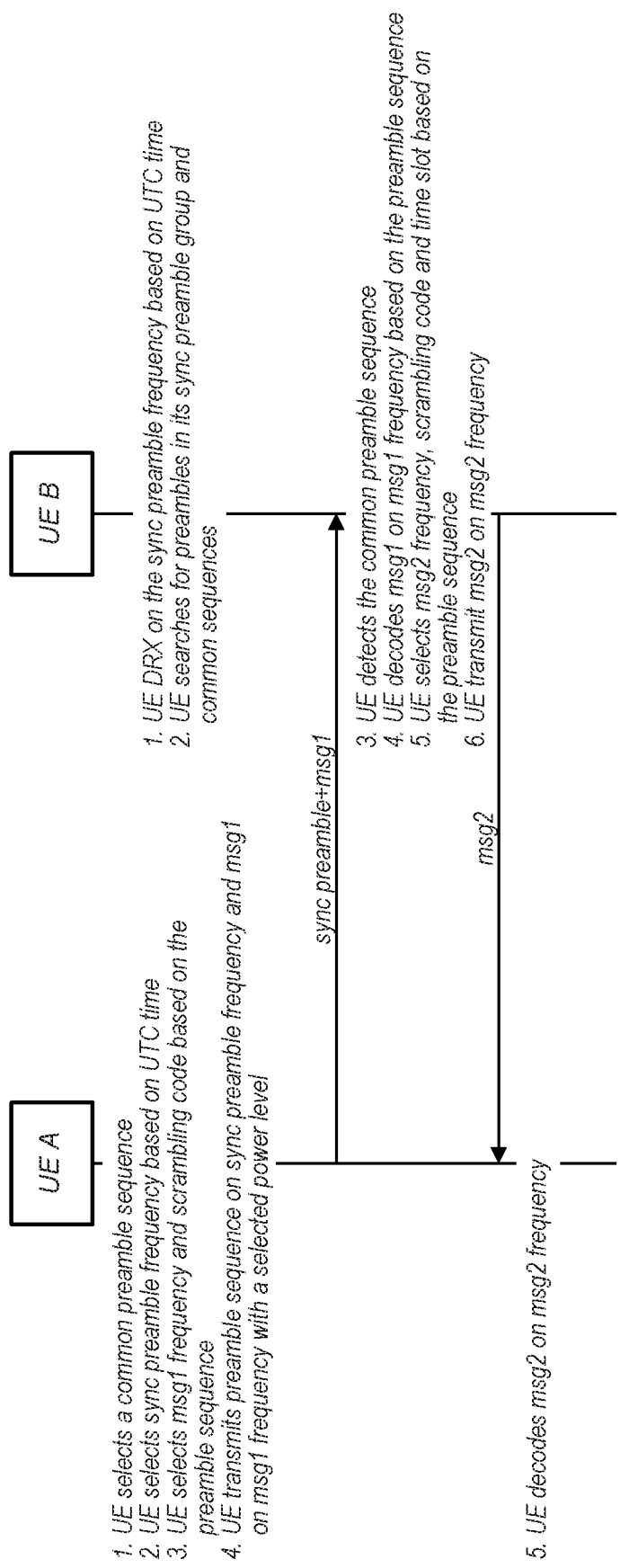
Figure 22:
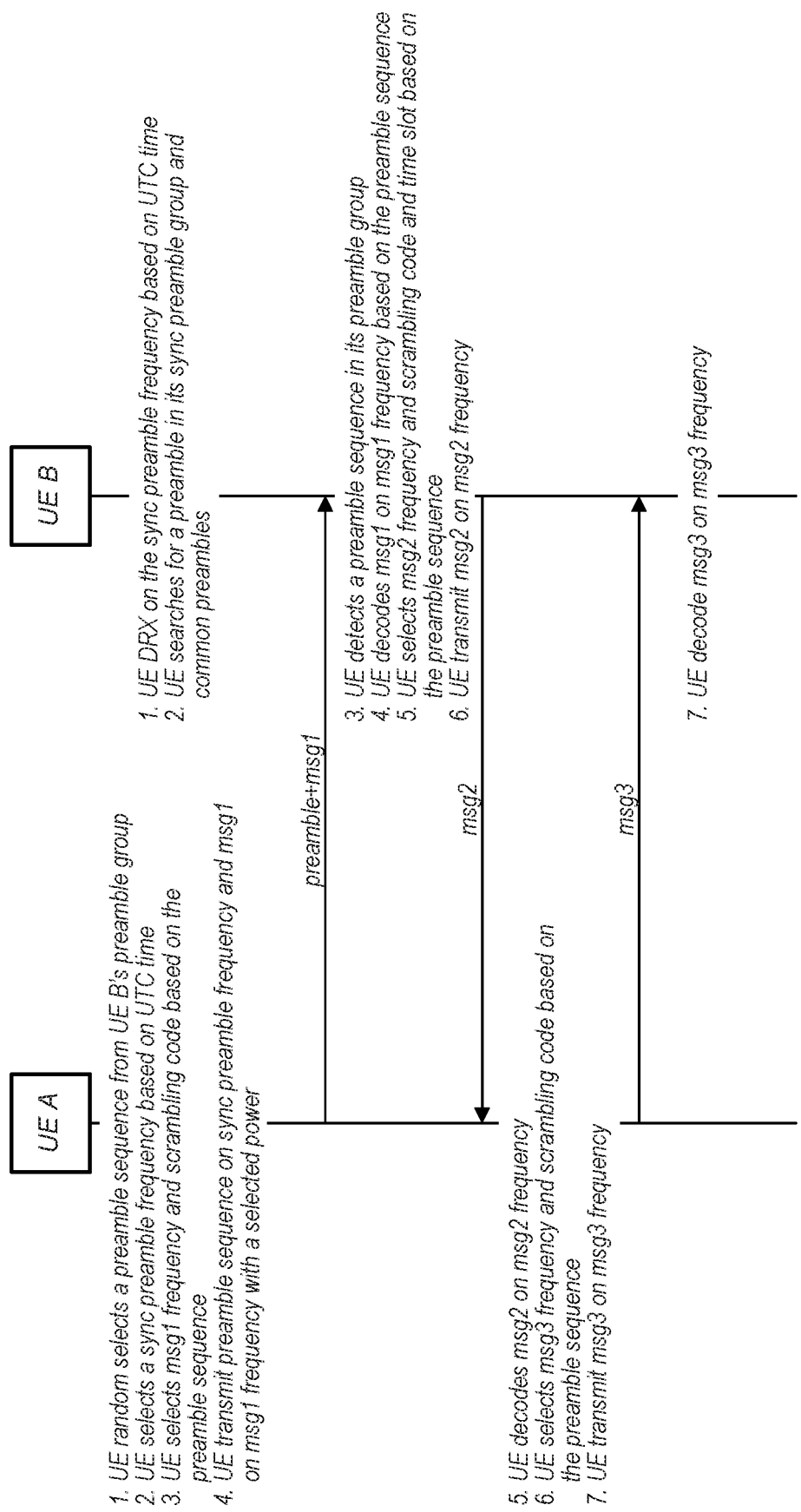

FIGS. 21-22 are signal flow diagrams illustrating possible presence and peer discovery communication sequences in accordance with a D2D communication framework. Note that as additional or alternative possibilities, FIGS. 23-24 also illustrate possible peer and presence discovery communication sequences in accordance with a possible synchronization preamble based framework for D2D communication.

As shown, in FIG. 21, UE A may desire to perform presence discovery for peer devices within communication range of UE A, which may include UE B (and possibly one or more additional devices). In this case, UE A may select a common preamble sequence, may select a sync preamble frequency for the preamble sequence based on UTC time, and may select a msg 1 frequency and scrambling code based on the preamble sequence. The UE A may transmit the preamble sequence on the sync preamble frequency and the msg 1 on the msg 1 frequency with a selected power level (e.g., a lower power level for an initial presence discovery transmission, an increased power level for a repeated presence discovery transmission, etc.).

The UE B may be an idle UE that searches for preambles in its sync preamble group and for common sequences during the sync preamble portion of each D2D period on the sync preamble frequency configured for the D2D period based on UTC time. As a result, the UE B may detect the common preamble sequence transmitted by UE A, and may decode the msg 1 on the msg 1 frequency, which UE B may be able to determine based on the specific preamble sequence used by UE A. The UE B may also select a msg 2 frequency, scrambling code, and time slot based on the preamble sequence, and may transmit the msg 2 on the msg 2 frequency. If other devices are also within communication range of UE A, they may similarly be able to detect the common preamble sequence and respond on the msg 2 frequency.

The UE A may be able to decode the msg 2 from UE B (and potentially other msg 2s from other UEs) on the msg 2 frequency, and may thus be able to determine the presence of UE B (and potentially any other UEs in the vicinity).

As shown, in FIG. 22, UE A may desire to perform peer discovery for a peer device (i.e., UE B) that may be within communication range of UE A. At least in some instances, the UE A and UE B may have previously performed presence discovery to determine that they are within communication range of each other. UE A may randomly select a preamble sequence from UE B's preamble group, may select a sync preamble frequency for the preamble sequence based on UTC time, and may select a msg 1 frequency and scrambling code based on the preamble sequence. The UE A may transmit the preamble sequence on the sync preamble frequency and the msg 1 on the msg 1 frequency with a selected power level (e.g., a lower power level for an initial peer discovery transmission, an increased power level for a repeated peer discovery transmission, etc.).

Similar to the scenario of FIG. 19, the UE B may be an idle UE that searches for preambles in its sync preamble group and for common sequences during the sync preamble portion of each D2D period on the sync preamble frequency configured for the D2D period based on UTC time. As a result, the UE B may detect the preamble sequence in its preamble group transmitted by UE A, and may decode the msg 1 on the msg 1 frequency, which UE B may be able to determine based on the specific preamble sequence used by UE A. The UE B may also select a msg 2 frequency, scrambling code, and time slot based on the preamble sequence, and may transmit the msg 2 on the msg 2 frequency.

The UE A may be able to decode the msg 2 from UE B on the msg 2 frequency, and may select a msg 3 frequency and scrambling code, again based on the preamble sequence. The UE A may transmit the msg 3 on the msg 3 frequency.

The UE B may decode the msg 3 on the msg 3 frequency to complete the peer discovery process. The UE A and the UE B may subsequently perform P2P communication, e.g., during the P2P communication period of the D2D period.

Figure 23:
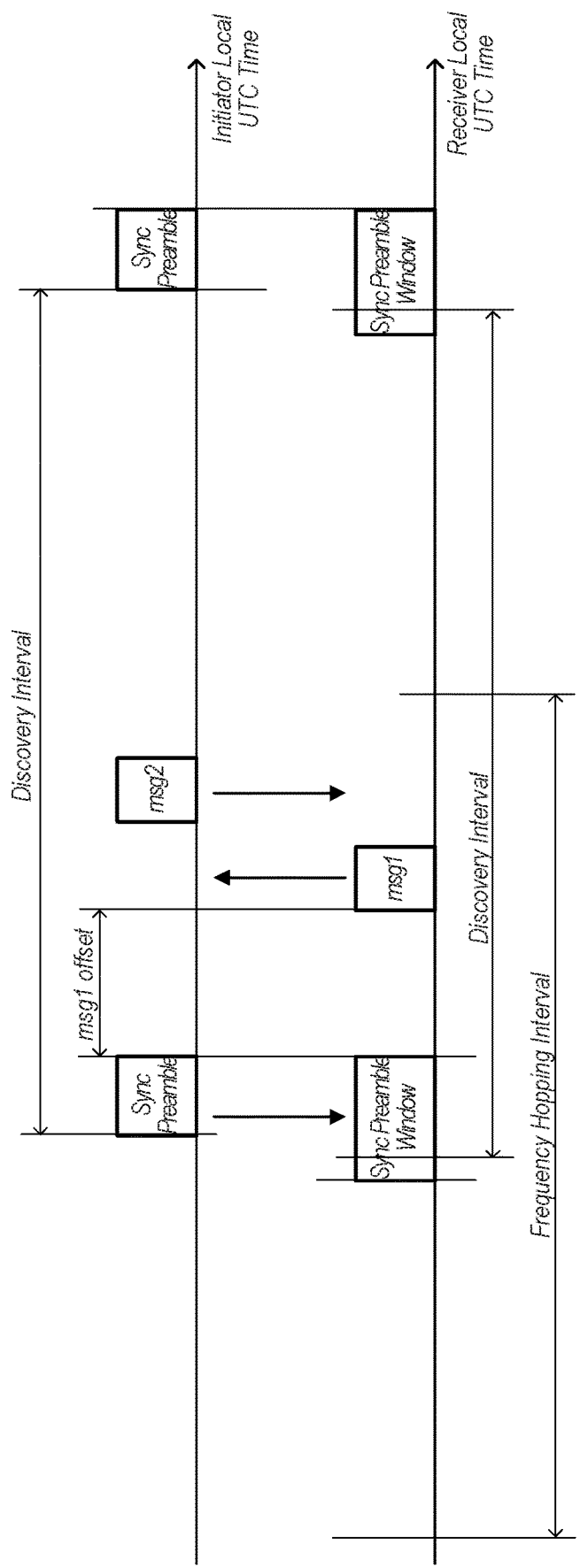

FIG. 23 illustrates a timeline representation of a possible peer discovery procedure, which may be used in addition or as an alternative to the procedure illustrated in FIG. 22. As shown, an initiator UE may send a dedicated sync preamble to a receiver UE. The sync preamble frequency may be selected based on the common UE ID and local UTC time. The sync ID may be selected based on the peer (e.g., receiver) UE ID and local UTC time. A sync preamble sequence may be randomly selected from the selected sync ID preamble sequence group. The selected sync preamble may be transmitted at the start of a discovery interval (e.g., according to the initiator UE's local UTC clock).

The receiver UE may detect the sync preamble and respond with a msg1 response. The receiver UE may be able to determine the initiator UE's discovery interval start time offset and frequency offset by detecting the relative location of the sync preamble within the sync preamble window. The receiver UE may send the msg1 to the initiator UE at a time offset from the sync preamble that is pre-defined, or may be selected based on the detected sync preamble sequence. The msg1 frequency may be determined based on the detected sync preamble sequence. The msg1 content may include any or all of receiver UE ID, receiver UTC accuracy, local UTC time for discovery interval start time, anchor points, discovery time offset and frequency offset. The msg1 may be transmitted using the initiator UE's timing and frequency.

The initiator UE may detect the msg1 and respond with a msg2. The initiator UE may update its discovered UE list with the receiver UE's UE ID, discovery time offset, anchor points, and frequency offset. The initiator UE may determine a time offset from the msg1 to the msg2, and may determine the msg2 frequency based on the receiver UE ID and the receiver UE UTC time. The msg2 content may include any or all of initiator UE ID, initiator UTC accuracy, local UTC time for discovery interval start time, and anchor points. The msg2 may be transmitted using the receiver UE's timing and frequency.

The receiver UE may receive the msg2 and may similarly update its discovered UE list with the initiator UE's UE ID, discovery time offset, anchor points, and frequency offset.

Figure 24:
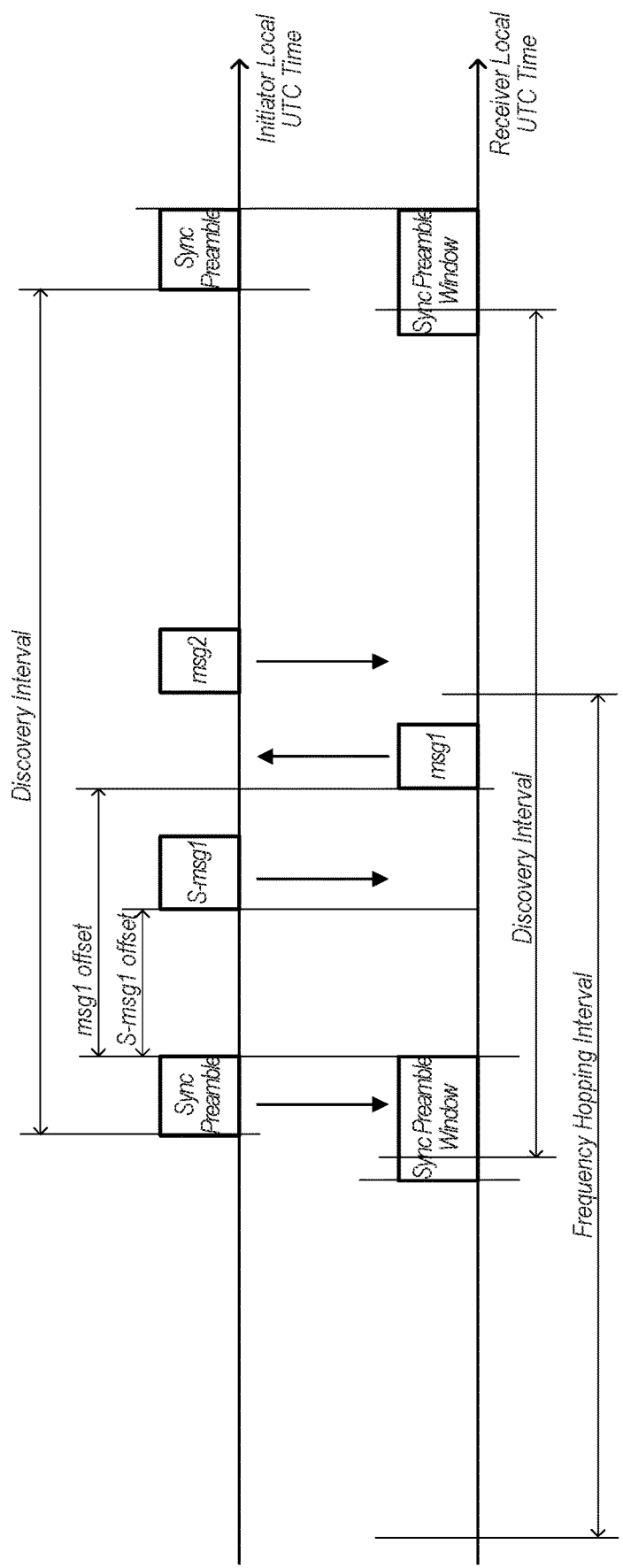

FIG. 24 illustrates a timeline representation of a possible peer discovery procedure, which may be used in addition or as an alternative to the procedure illustrated in FIG. 21. As shown, an initiator UE may send a common sync preamble to a receiver UE, with a 's-msg1'. The sync preamble frequency may be selected based on the common UE ID and local UTC time. A related common sync ID may be selected. A sync preamble sequence may be randomly selected from the selected sync ID preamble sequence group. The initiator UE may determine a time offset from the sync preamble to the s-msg1, which may be predefined or based on the sync preamble sequence. The smsg1 frequency may be selected based on the sync preamble sequence. The s-msg1 content may include the initiator UE ID, msg1 resource configuration index, and any other desired presence specific information. Note that there may be multiple predefined msg1 resource configurations, e.g., multiple time offsets and multiple sub-carrier configurations on different MCS and RSSI levels, such that different msg1 resource configurations can be associated with different msg1 resource configuration indices. The selected sync preamble and s-msg1 may be transmitted at the start of a discovery interval (e.g., according to the initiator UE's local UTC clock).

The receiver UE may detect the sync preamble and decode the s-msg1 and respond with a msg1 response. The receiver UE may be able to determine the initiator UE's discovery interval start time offset and frequency offset by detecting the relative location of the sync preamble within the sync preamble window. The receiver UE may be able to determine the time offset from the sync preamble to the s-msg1, as it may be predefined or may be based on the detected sync preamble sequence, and may be able to determine the s-msg1 frequency based on the detected sync preamble sequence, and so may be able to detect and decode the s-msg1. The receiver UE may determine a time offset from the s-msg1 to the msg1 based on measured RSSI level and the msg1 resource configuration index indicated in the s-msg1, may randomly select a sub-carrier configuration from a sub-carrier configuration set based on the msg1 resource configuration index, and may determine the msg1 frequency based on the detected sync preamble sequence. The msg1 content may include any or all of receiver UE ID, receiver UTC accuracy, local UTC time for discovery interval start time, anchor points, discovery time offset and frequency offset. The msg1 may be transmitted using the initiator UE's timing and frequency.

The initiator UE may detect the msg1 and respond with a msg2. The initiator UE may update its discovered UE list with the receiver UE's UE ID, discovery time offset, anchor points, and frequency offset. The initiator UE may determine a time offset from the msg1 to the msg2, and may determine the msg2 frequency based on the receiver UE ID and the receiver UE UTC time. The msg2 content may include any or all of initiator UE ID, initiator UTC accuracy, local UTC time for discovery interval start time, and anchor points. The msg2 may be transmitted using the receiver UE's timing and frequency.

The receiver UE may receive the msg2 and may similarly update its discovered UE list with the initiator UE's UE ID, discovery time offset, anchor points, and frequency offset.

Once a discovery procedure is complete between two wireless devices, both the initiator UE and the receiver UE may be in a discovered state with respect to each other, and the wireless devices may be able to perform D2D communication. A discovered UE may have regular discovery intervals, which may include a normal sync preamble window that may continue to be used for searching for its associated sync preambles sent by other UEs that have UEC time difference from the local UTC time of the UE less than or equal to the normal drift room. The discovery intervals may also include a msg1 zone, which may provide a time window in which msg1s are transmitted/received by other UEs (and possibly the discovered UE, if it is performing additional discovery), e.g., if msg1 transmission has a predefined time offset from sync preamble transmission. In some instances, a UE may be able to transmit data packets over the msg1 zone as long as the transmit power is below a configured threshold (e.g., 30 dBm, or any other desired threshold). Similarly, the discovery intervals may include a msg2 zone, which may provide a time window in which msg2s are transmitted/received by other UEs (and possibly the discovered UE, if it is performing additional discovery), e.g., if msg2 transmission has a predefined time offset from sync preamble transmission. A UE may also be able to transmit data packets over the msg2 zone as long as the transmit power is below a configured threshold (e.g., 30 dBm, or any other desired threshold), at least according to some embodiments. Transmission and reception of data packets may be managed in accordance with schedule intervals of a discovery interval.

A discovered UE may have a list of N (e.g., a number) discovered neighbor UEs, each of which may be assigned to a schedule interval in a cycle of N schedule intervals. For each schedule interval, if no data is pending, the UE may listen for an anchor preamble in the anchor window of the schedule interval. If an anchor preamble is detected, the receiving UE may become clock master for the schedule interval, a data session with the initiator UE may be started, and the initiator and receiver UEs may proceed with transmission and reception of data packets based on the receiver UE's timing and frequency hopping sequence, over one or more consecutive schedule intervals, until the data session is complete. If there is data pending, the UE may transmit an anchor preamble as initiator. If an anchor msg1 is received, the initiator UE may be come the clock slave for the schedule interval, a data session with the receiver UE may be started, and the initiator and receiver UEs may proceed with transmission and reception of data packets based on the receiver UE's timing and frequency hopping sequence, over one or more consecutive schedule intervals, until the data session is complete.

A discovered UE may also listen for sync preambles over a long sync preamble window (e.g., with a length of one discovery interval plus double the normal drift room, according to a previously provided example, or with any other desired length), once per a certain number of discovery intervals. As previously noted, such a long sync preamble window may be used for searching for sync preambles associated with a UE that are sent from UEs that have a UTC time difference from the local UTC time of the UE of greater than the normal drift room.

Figure 25:
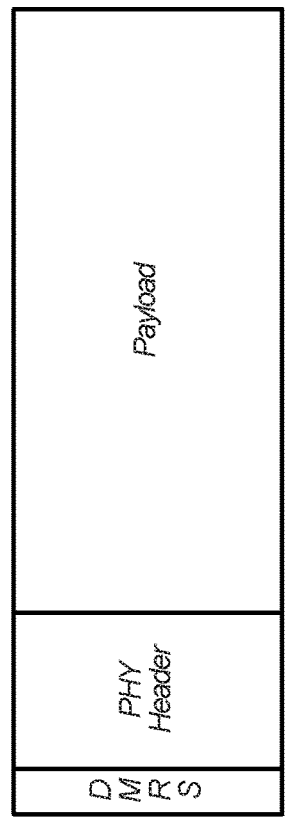

According to some embodiments, a packet structure that could be used as part of a synchronization preamble based P2P communication framework is illustrated in FIG. 25. As shown, the packet structure may include a Zadoff-Chu sequence based demodulation reference signal (DMRS) as preamble for symbol timing and frequency tracking, and which may also indicate a PHY header type (e.g., normal or long). The normal PHY header may have a fixed MCS for MCL<=155, while the long PHY header may have a fixed MCS for MCL<=163, according to some embodiments. Other configurations are also envisioned. The PHY header may indicate the payload format, and may include subcarrier and resource indication, MCS and RV, repetition number, and a new data indicator.

The payload may include one or more MAC control elements, which may indicate a transmit power level, UTC time and accuracy level, symbol time offset and frequency offset, and pending data volume. Note that a msg1 as a special payload may include MAC control elements for UTC time, transmit power level, initiator symbol time offset and carrier frequency offset, UE ID for the receiver UE, link ID (e.g., similar to a cell radio network temporary identifier (C-RNTI), assigned by the receiver UE), and anchor points (e.g., indicating the location of anchor preamble and anchor window for the link). Likewise, a msg2 as a special payload may include MAC control elements for UTC time, transmit power level, UE ID for the initiator UE, and anchor points.

Note that since such a D2D communication framework may utilize UTC clock information to determine D2D period timing, it may be beneficial for wireless devices operating in such a framework to be aware of their potential UTC clock drift rate and current potential UTC clock drift at any given time, e.g., to improve the likelihood of the wireless device to be able to successfully detect synchronization signals from peer devices during DRX operation. For example, if a wireless device expects up to ±10 ppm drift for one hour when no sync source for the UTC clock of the wireless device is available, the UTC clock drift may be approximately ±36 ms. Thus, a wireless device that is aware of its potential UTC clock drift may extend the DRX on duration length (e.g., before and/or after the nominal on duration length) to better be able to detect sync preamble transmissions in case of actual drift to the UTC clock of the wireless device, albeit at a potential cost of additional power consumption. Alternatively or in addition, as previously noted herein, multiple sync preamble windows may be configured and monitored according to different intervals to account for possible UTC clock drift of a UE and of possible neighbor UEs.

Such a wireless device may also reset its estimation of potential UTC clock drift upon synchronizing its UTC clock to a UTC clock source, such as obtaining GNSS synchronization, receiving a common sync preamble or a sync preamble used for discovery that is sent by another wireless device operating with the D2D communication framework and thus synchronized to UTC time, or otherwise performing P2P communication with another wireless device that is synchronized to UTC time. This may allow the wireless device to resume use of the nominal DRX on duration length specified by the D2D communication framework, which may reduce power consumption.

As another possibility, a UE that is involved in any discovery and P2P communication may update its local UTC time to the average UTC time among its neighbor UEs with most accurate UTC times in the geographical reachable range of the UE. For example, if any UE in range has GNSS coverage, the converged common UTC time among the crowd may be the most accurate GNSS UTC time. If no UE in range has GNSS coverage, the converged common UTC time among the crowd may be the average UTC time among all neighbors.

According to such a UTC time updating framework, a UE may update its UTC time from GNSS while in an idle state, at least according to some embodiments. The UE may generally update its UTC time with the most accurate time among all UEs in its discovered list upon entering idle state from a discovered state. If there are 2 or more UEs with equally (or approximately equally) accurate UTC time, the UE may update to the average UTC time from those UEs.

The UE may also continually estimate its UTC time drift, and may be configured to perform UTC time presence discovery as long as its estimated UTC time drift is less than a configured threshold (e.g., such that the estimated UTC time drift is close to the normal drift room accounted for by the D2D communication framework). In such a case, the UE may be able to send presense discovery communications with its local UTC time and accuracy, receive msg1s with UTC time from all UEs with better UTC accuracy, and update its UTC time from the average of all UTC times with most accuracy.

For a UE with UTC time drift greater than the configured threshold (e.g., greater than the normal drift room, for example if the UE were isolated without GNSS coverage for multiple days, as one example), the UE can perform an initial search (e.g., enter an initial search state) with a long or extended (e.g., possibly depending on the estimated UTC time drift) sync preamble window for a certain number of discovery intervals, e.g., to attempt to adjust the initial UTC time error. The UE may attempt to acquire an accurate UTC clock from GNSS synchronization and may attempt to detect any sync preamble sequences and then retrieve the UTC clock from the corresponding msg1 during such a search.

Additionally or alternatively, the UE may attempt to transmit a sync preamble during a discovery interval that has a long sync preamble window. In such a case, the UE may transmit the common sync preamble in multiple discovery intervals, e.g., starting before the targeted discovery interval and extending after the targeted discovery interval by a number of intervals based at least in part on the extent of the estimated UTC time drift. For example, the UE might transmit in 2*m+1 consecutive discovery intervals, starting from discovery interval n-m, where m is a number of discovery intervals whose length is equal to (or approximates) the estimated UTC time drift of the UE, and n is the targeted discovery interval with the long sync preamble window.

In a synchronization preamble based P2P communication framework such as described herein, discovery collisions may occur from sync preamble collisions. In a low UE density scenario, the sync preamble collision rate between UEs may be relatively low, e.g., due to the low UE density, even though sync preambles in the common sync preamble receive window may not be perfectly aligned due to potential UTC drift room. In a high UE density scenario, all UEs in an area may quickly converge to a common UTC time, whether GNSS based on non-GNSS based, as long as they are involved in communication. Thus, in this case, the potential for a high discovery collision rate may be reduced due to the multiple ZC sequences being used as sync preambles being aligned to the same discovery interval start time based on the same common UTC time and with the same transmit power. The discovery collision rate between such an approach and a global sync approach (e.g., at the same SINR) can be estimated by comparing the coding rate of a msg1 in the global sync approach with the coding rate of a sync preamble. For example, a msg1 may have 36 bits in 32 ms in a global sync approach, at least in some instances. A sync preamble may have 504 sequences, about 9 bits in 50 ms in a preamble approach, at least in some instances. Thus, in this example, a sync preamble may be about 8 dB better than a msg1 in a global sync approach. Note that this example is provided for illustrative purposes and is not intended to be limiting to the disclosure as a whole.

At least according to some embodiments, msg1 collisions in a synchronization preamble based P2P communication framework such as described herein may be minimized by selecting the msg1 frequency based on the sync preamble sequence in response to which the msg1 is provided. Additionally, msg2 collisions and msg1/msg2 collisions may be relatively minimized by selecting the msg2 frequency according to the receiver UE's FH sequence. Similarly, data/msg2/msg1 collisions may also be relatively minimized by selecting the data frequency according to the receiver UE's FH sequence.

It may be worth considering near-far concerns with respect to a synchronization preamble based P2P communication framework such as described herein. For example, consider that a 30 dBm transmission on any channel may block an entire ISM band within a close distance range (e.g., about 10 m, in some instances), at least according to some embodiments. To avoid causing problems to nearby UEs as a result of such transmissions, it may be the case that sync preamble transmissions at 30 dBM (or another configured transmit power) may be confined to the sync preamble window in a discovery interval. In a low UE density scenario, the near-far problem may not be dominant as interference from nearby UEs may be low, even though the sync preamble window may have a relatively large UTC time drift room. In a high UE density scenario, the near-far problem may be relatively dominant, but sync preambles may be confined to a smaller sync preamble window, as local UTC time of nearby UEs may quickly converge to a common UTC time with less UTC time drift. Transmissions of msg1 and msg2 for peer discovery, as well as data communications, may be less likely to have high transmit power, as they may be power controlled. In case data communication is performed with high transmit power, its interference on msg1/msg2 can be mitigated, e.g., by pre-defining the msg1 and msg2 time offset(s) to the sync preamble, and/or by disallowing transmission of data with transmit power over a certain threshold during the msg1 zone and the msg2 zone.

It may also be worth comparing certain possible communication characteristics for a synchronization preamble based approach to providing a P2P communication framework with a global synchronization based approach, in certain scenarios, at least according to some embodiments. For example, consider a hiking use case scenario, which may be characterized by low UE density, a relatively long distance between UEs, and/or less frequent P2P communication. In such a scenario, a UE may spend relatively more time in idle on average. In the preamble approach, UEs in range may have a larger local UTC time drift, but may still typically remain in a normal drift range, e.g., as long as a UE is able to find GNSS coverage about once an hour. It may be the case that relatively few pairs of P2P communication devices may generally be present, some of which may use relatively high transmit power due to long distance. A low discovery collision rate may be expected, and the near-far problem may not be dominant. In such a scenario, it may be the case that connection setup time for a preamble approach may be relatively consistent and may take approximately 200 ms, while connection setup time for a global sync approach may be longer, e.g., approximately 3 s or more due to searching for and synchronizing to (or becoming) a sync master, at least according to some embodiments. Power consumption may be relatively minimal for a preamble approach, but may be higher for a global sync approach due to there being fewer opportunities to share the sync master role among UEs in the area. In both approaches, discovery collisions may be minimal in such a scenario.

Consider also a cruise scenario, which may be characterized by high UE density, a mixture of long and short distances, and/or more frequent P2P communication. In such a scenario, a UE may spend relatively more time in communication on average. In the preamble approach, UEs in range may have a relatively small local UTC time drift, e.g., due to fast converging to a common UTC time, with or without GNSS coverage. It may be the case that many pairs of P2P communication devices may generally be present, some of which may be at long distance, and some of which may be at short distance. A high discovery collision rate may be expected, and the near-far problem may be dominant in some areas and only a minor problem in other areas. In such a scenario, both approaches may experience some discovery collisions, but the discovery collisions for the preamble approach may be reduced due to the use of multiple ZC sequences. Additionally, it may be the case that connection setup time for a preamble approach may experience some delay due to discovery collisions, but connection setup time for a global sync approach may be still longer, e.g., due to a higher discovery collision rate, even though a common sync master may be relatively easily found, at least according to some embodiments. Power consumption in both cases may depend primarily on actual P2P communication performed, with anchor preamble transmit power being power controlled and triggered by pending data in the preamble approach, but may also be higher for a global sync approach due to the extra power consumption from the sync master's high power synchronization signal transmissions.

Thus, at least according to some embodiments, such a D2D communication framework may improve the ability of wireless devices to communicate with other D2D capable wireless devices within the designed range, without limitation imposed by a third device's coverage range. Further, such a D2D communication framework may provide a relatively low discovery collision, reduced latency, and/or reduced power consumption, e.g., in comparison to a sync master based framework. Such a synchronization design may also be relatively simple, e.g., without potentially complex overhead that might otherwise be needed to establish and maintain global synchronization to a third device's symbol timing and carrier frequency. Additionally, at least in some embodiments, such an approach may allow for all UEs in a geographically reachable range to obtain a converged common UTC time, with or without GNSS coverage, which may allow for a relaxed GNSS requirement.

In the following further exemplary embodiments are provided.

One set of embodiments may include a method, comprising: by a first wireless device: determining a number of synchronization signal repetitions to use for a transmission; and performing the transmission, comprising transmitting the determined number of synchronization signal repetitions.

According to some embodiments, the method further comprises: selecting a first root index value for a first portion of the synchronization signal based at least in part on the determined number of synchronization signal repetitions, wherein the first root index value for the synchronization signal indicates the number of synchronization signal repetitions transmitted by the first wireless device.

According to some embodiments, the first root index value comprises a root index value for a Zadoff-Chu sequence used as a primary synchronization signal (PSS) of the synchronization signal, wherein the synchronization signal further comprises a secondary synchronization signal (SSS), wherein the SSS also comprises a Zadoff-Chu sequence, wherein the method further comprises: selecting a second root index value for the SSS, wherein the second root index value indicates a device identifier for the first wireless device; wherein the synchronization signal further comprises a physical broadcast channel that indicates a frame number and subframe number according to a local clock of the first wireless device.

According to some embodiments, the transmission further comprises a discovery signal, wherein the method further comprises: performing the transmission on each frequency of a predetermined sequence of discovery transmission frequencies.

According to some embodiments, the method further comprises, after performing the transmission on each frequency of the predetermined sequence of discovery transmission frequencies: monitoring each frequency of a predetermined sequence of discovery response frequencies for a discovery response.

According to some embodiments, the number of synchronization signal repetitions is determined based at least in part on characteristics of a transmission from a second wireless device previously received by the first wireless device.

According to some embodiments, the characteristics of the transmission from the second wireless device previously received by the first wireless device comprise one or more of: a value of a signal strength metric for the transmission from the second wireless device previously received by the first wireless device; a value of a signal quality metric for the transmission from the second wireless device previously received by the first wireless device; or a number of repetitions used by the first wireless device to decode the transmission from the second wireless device previously received by the first wireless device.

According to some embodiments, the transmission to the second wireless device comprises a narrowband peer-to-peer communication.

Another set of embodiments may include a method, comprising: by a wireless device: receiving a first transmission, wherein the first transmission comprises a synchronization signal and a discovery message; determining a first root index value for the synchronization signal of the first transmission; determining a number of repetitions of the synchronization signal of the first transmission based at least in part on the first root index value; and determining when the discovery message begins based at least in part on the determined number of repetitions of the synchronization signal of the first transmission.

According to some embodiments, the method further comprises: determining that the wireless device is unable to decode the discovery message comprised in the first transmission; receiving a second transmission, wherein the second transmission comprises a synchronization signal and a discovery message; and combining the discovery message comprised in the first transmission with the discovery message comprised in the second transmission.

According to some embodiments, the method further comprises: determining a sequence of discovery message transmission frequencies used by a wireless device that performed the first transmission based at least in part on the synchronization signal, wherein the second transmission is received on a different frequency than the first transmission, wherein the frequency on which the second transmission is received is determined based on the sequence of discovery message transmission frequencies used by the wireless device that performed the first transmission.

According to some embodiments, the second transmission is received on a same frequency as the first transmission during a subsequent discovery period.

According to some embodiments, the method further comprises: determining a sequence of discovery response transmission frequencies based at least in part on the first transmission; and performing a discovery response transmission on each frequency of the sequence of discovery response transmission frequencies.

According to some embodiments, the discovery response transmission comprises a preamble, wherein the method further comprises: determining a number of preamble repetitions for the discovery response transmission; and selecting a root index value for the preamble based on the determined number of preamble repetitions.

According to some embodiments, the number of preamble repetitions for the discovery response transmission is determined based at least in part on a signal strength, a signal quality, and a number of repetitions used by the wireless device to decode the discovery message.

According to some embodiments, the discovery response transmission comprises an indication of a device identifier for the wireless device and a local clock value for the wireless device.

Yet another set of embodiments may include a method, comprising: by a wireless device: selecting a device-todevice (D2D) synchronization preamble sequence to transmit from a plurality of possible D2D synchronization preamble sequences; transmitting the D2D synchronization preamble sequence at a time and frequency selected based at least in part on a coordinated universal time (UTC) clock maintained by the wireless device; and transmitting a D2D discovery message at a time and frequency selected based at least in part on the D2D synchronization preamble sequence selected.

According to some embodiments, the method further comprises, by the wireless device: selecting a common D2D synchronization preamble sequence to transmit from a plurality of possible common D2D synchronization preamble sequences, wherein the D2D common synchronization preamble sequence is selected for performing presence discovery for peer devices within communication range of the wireless device.

According to some embodiments, the method further comprises, by the wireless device: selecting a D2D synchronization preamble sequence in a preamble group associated with a second wireless device to transmit from a plurality of possible D2D synchronization preamble sequences in the preamble group associated with the second wireless device, wherein the D2D synchronization preamble sequence is selected for performing peer discovery with the second wireless device.

According to some embodiments, a scrambling code for the D2D discovery message is selected based at least in part on the D2D synchronization preamble sequence selected.

According to some embodiments, the method further comprises, by the wireless device: receiving a discovery response message from a second wireless device at a frequency selected based at least in part on the D2D synchronization preamble sequence selected.

According to some embodiments, the method further comprises, by the wireless device: selecting a D2D synchronization preamble type for the D2D synchronization preamble sequence, wherein the D2D synchronization preamble type is selected from at least a normal D2D synchronization preamble and long D2D synchronization preamble.

A further set of embodiments may include a method, comprising: by a wireless device: selectively monitoring a frequency channel for device to device (D2D) synchronization preamble sequences according to a discontinuous reception (DRX) cycle, wherein the frequency channel monitored is selected based at least in part on a coordinated universal time (UTC) clock maintained by the wireless device, wherein the DRX cycle timing is also selected based at least in part on the UTC clock maintained by the wireless device; receiving a D2D synchronization preamble sequence during an on duration portion of the DRX cycle; and receiving a D2D discovery message at a time and frequency selected based at least in part on the D2D synchronization preamble sequence received.

According to some embodiments, the method further comprises, by the wireless device: estimating a potential UTC clock drift of the UTC clock maintained by the wireless device; and modifying a length of the on duration portion of the DRX cycle based at least in part on the estimated potential UTC clock drift of the UTC clock maintained by the wireless device.

According to some embodiments, the method further comprises, by the wireless device: updating the UTC clock and the estimated potential UTC clock drift of the UTC clock maintained by the wireless device based at least in part on synchronization of the UTC clock maintained by the wireless device with global navigational satellite system (GNSS) signals received by the wireless device.

According to some embodiments, the method further comprises, by the wireless device: updating the UTC clock and the estimated potential UTC clock drift of the UTC clock maintained by the wireless device based at least in part on receiving the D2D synchronization preamble sequence.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a wireless device to:
determine, based on a previously received signal, a number of times to repeatedly transmit a signal in respective discovery periods of a plurality of discovery periods as part of device to device communications, the signal comprising:
a first plurality of consecutive repetitions of a primary synchronization signal;
a second plurality of consecutive repetitions of a secondary synchronization signal, wherein the second plurality of consecutive repetitions of the secondary synchronization signal is subsequent to the first plurality of consecutive repetitions of the primary synchronization signal; and
a broadcast channel; and
repeatedly transmit the signal the number of times per discovery period in the respective discovery periods of the plurality of discovery periods as part of device to device communications.

2. The apparatus of claim 1, wherein the broadcast channel is repeated.

3. The apparatus of claim 2, wherein:
the first plurality of consecutive repetitions of the primary synchronization signal includes a certain number of repetitions,
the second plurality of consecutive repetitions of the secondary synchronization signal includes the certain number of repetitions, and
the broadcast channel is repeated according to the certain number of repetitions.

4. The apparatus of claim 3, wherein at least a portion of the broadcast channel is subsequent to the second plurality of consecutive repetitions of the secondary synchronization signal.

5. The apparatus of claim 1, wherein the broadcast channel provides an indication of a frame number and subframe number.

6. The apparatus of claim 1, wherein the signal is transmitted on a sequence of discovery transmission frequencies.

7. The apparatus of claim 1, wherein the signal further comprises:
a shared channel transmission, wherein a medium access control (MAC) header includes an indication of a Layer-2 ID of the of a source and a target of the shared channel transmission.

8. A wireless device, comprising:
a radio; and
a processor operably coupled to the radio and configured to cause the wireless device to:
determine, based on a previously received signal, a number of times to repeatedly transmit a signal in respective discovery periods of a plurality of discovery periods, as part of device to device communications, the signal comprising:
a first plurality of consecutive repetitions of a primary synchronization signal;
a second plurality of consecutive repetitions of a secondary synchronization signal, wherein the second plurality of consecutive repetitions of the secondary synchronization signal is subsequent to the first plurality of consecutive repetitions of the primary synchronization signal; and
a broadcast channel; and
repeatedly transmit the signal the number of times per discovery period in respective discovery periods of the plurality of discovery periods as part of device to device communications.

9. The wireless device of claim 8, wherein the broadcast channel is repeated.

10. The wireless device of claim 9, wherein:
the first plurality of consecutive repetitions of the primary synchronization signal includes a certain number of repetitions,
the second plurality of consecutive repetitions of the secondary synchronization signal includes the certain number of repetitions, and
the broadcast channel is repeated according to the certain number of repetitions.

11. The wireless device of claim 8, wherein at least a portion of the broadcast channel is subsequent to the second plurality of consecutive repetitions of the secondary synchronization signal.

12. The wireless device of claim 8, wherein the broadcast channel provides an indication of a frame number and subframe number.

13. The wireless device of claim 8, wherein the signal is transmitted on a sequence of discovery transmission frequencies.

14. The wireless device of claim 8, wherein the signal further comprises:
a shared channel transmission, wherein a medium access control (MAC) header includes an indication of a Layer-2 ID of the of a source and a target of the shared channel transmission.

15. A method, comprising:
at a wireless device:
determining, based on a previously received signal, a number of times to repeatedly transmit a signal in respective discovery periods of a plurality of discovery periods as part of device to device communications, the signal comprising:
a first plurality of consecutive repetitions of a primary synchronization signal;
a second plurality of consecutive repetitions of a secondary synchronization signal, wherein the second plurality of consecutive repetitions of the secondary synchronization signal is subsequent to the first plurality of consecutive repetitions of the primary synchronization signal; and
a broadcast channel; and
repeatedly transmitting the signal the number of times per discovery period in respective discovery periods of the plurality of discovery periods as part of device to device communications.

16. The method of claim 15, wherein the broadcast channel is repeated.

17. The method of claim 16, wherein:
the first plurality of consecutive repetitions of the primary synchronization signal includes a certain number of repetitions,
the second plurality of consecutive repetitions of the secondary synchronization signal includes the certain number of repetitions, and
the broadcast channel is repeated according to the certain number of repetitions.

18. The method of claim 17, wherein at least a portion of the broadcast channel is subsequent to the second plurality of consecutive repetitions of the secondary synchronization signal.

19. The method of claim 15, wherein the signal further comprises:
- a shared channel transmission, wherein a medium access control (MAC) header includes an indication of a Layer-2 ID of the of a source and a target of the shared channel transmission.

20. The method of claim 15, wherein the broadcast channel provides an indication of a frame number and subframe number.

\* \* \* \* \*